United States Patent [19]
Landoll et al.

[11] Patent Number: 6,126,378
[45] Date of Patent: Oct. 3, 2000

[54] MULTI-PURPOSE, LOW-LOAD ANGLE TRAILER WITH LATERALLY EXTENDABLE WINCH ARMS

[75] Inventors: Donald R. Landoll, Marysville; Loren F. Wassenberg, Blue Rapids; David J. Kongs, Marysville, all of Kans.

[73] Assignee: Landoll Corporation, Marysville, Kans.

[21] Appl. No.: 09/084,126

[22] Filed: May 22, 1998

[51] Int. Cl.[7] .................................................. B65G 67/04
[52] U.S. Cl. .......................... 414/494; 414/500; 414/538; 414/559; 414/812; 254/328
[58] Field of Search .................................... 414/500, 494, 414/538, 559, 812; 254/331, 323, 325, 328

[56] References Cited

U.S. PATENT DOCUMENTS

| | | |
|---|---|---|
| 1,450,301 | 4/1923 | Norris ...................................... 254/328 |
| 2,021,952 | 11/1935 | Wren ...................................... 414/500 |
| 2,305,762 | 12/1942 | Cristofoletti et al. .................. 414/538 |
| 2,717,707 | 9/1955 | Martin . |
| 2,753,064 | 7/1956 | Lesser . |
| 2,776,769 | 1/1957 | McDonald . |
| 3,087,741 | 4/1963 | De Lay . |
| 3,841,509 | 10/1974 | Chisum . |
| 3,861,716 | 1/1975 | Baxter et al. . |
| 3,981,408 | 9/1976 | Chisum . |
| 4,026,429 | 5/1977 | Rummell . |
| 4,125,198 | 11/1978 | Landoll . |
| 4,130,211 | 12/1978 | Abascal . |
| 4,231,710 | 11/1980 | Landoll . |
| 4,302,022 | 11/1981 | Schoeffler et al. . |
| 4,568,235 | 2/1986 | Bills, Jr. . |
| 4,635,983 | 1/1987 | Boland et al. ....................... 254/323 X |
| 4,802,811 | 2/1989 | Nijenhuis ............................. 414/500 X |
| 4,946,333 | 8/1990 | Boatwright ......................... 414/500 X |
| 5,211,413 | 5/1993 | Williams et al. . |
| 5,522,582 | 6/1996 | Dilks ...................................... 254/323 |

FOREIGN PATENT DOCUMENTS

| | | | |
|---|---|---|---|
| 909172 | 9/1972 | Canada ................................. 414/494 |
| 246500 | 6/1987 | Germany . | |
| 82228 | 4/1988 | Japan ..................................... 414/500 |

OTHER PUBLICATIONS

Landoll Model 600 Series Multi–Function Trailer Operator's Manual, (Jan. 1996, pp. 3–15 through 3–24).
TandemLoc, Inc. Catalog 92797 (undated, pp. 1 through 16).

Primary Examiner—Steven A. Bratlie
Attorney, Agent, or Firm—Hovey, Williams, Timmons & Collins

[57] ABSTRACT

A self-loading trailer has a flat deck that can be raised and lowered between a horizontal transport position and a downwardly and rearwardly inclined loading position. A pair of winches adjacent the front end of the deck are normally maintained in a stowed position slightly inboard from opposite sides from the deck but can be shifted outwardly into extended positions outboard of the lateral confines of the deck. In such extended positions, the winches may be used to draw a first container up onto the deck as the inclined deck is moved rearwardly under the container, and then a second container behind the first container, without interfering with the first container. When both containers are fully loaded, the winches are retracted back into their stored positions.

6 Claims, 16 Drawing Sheets

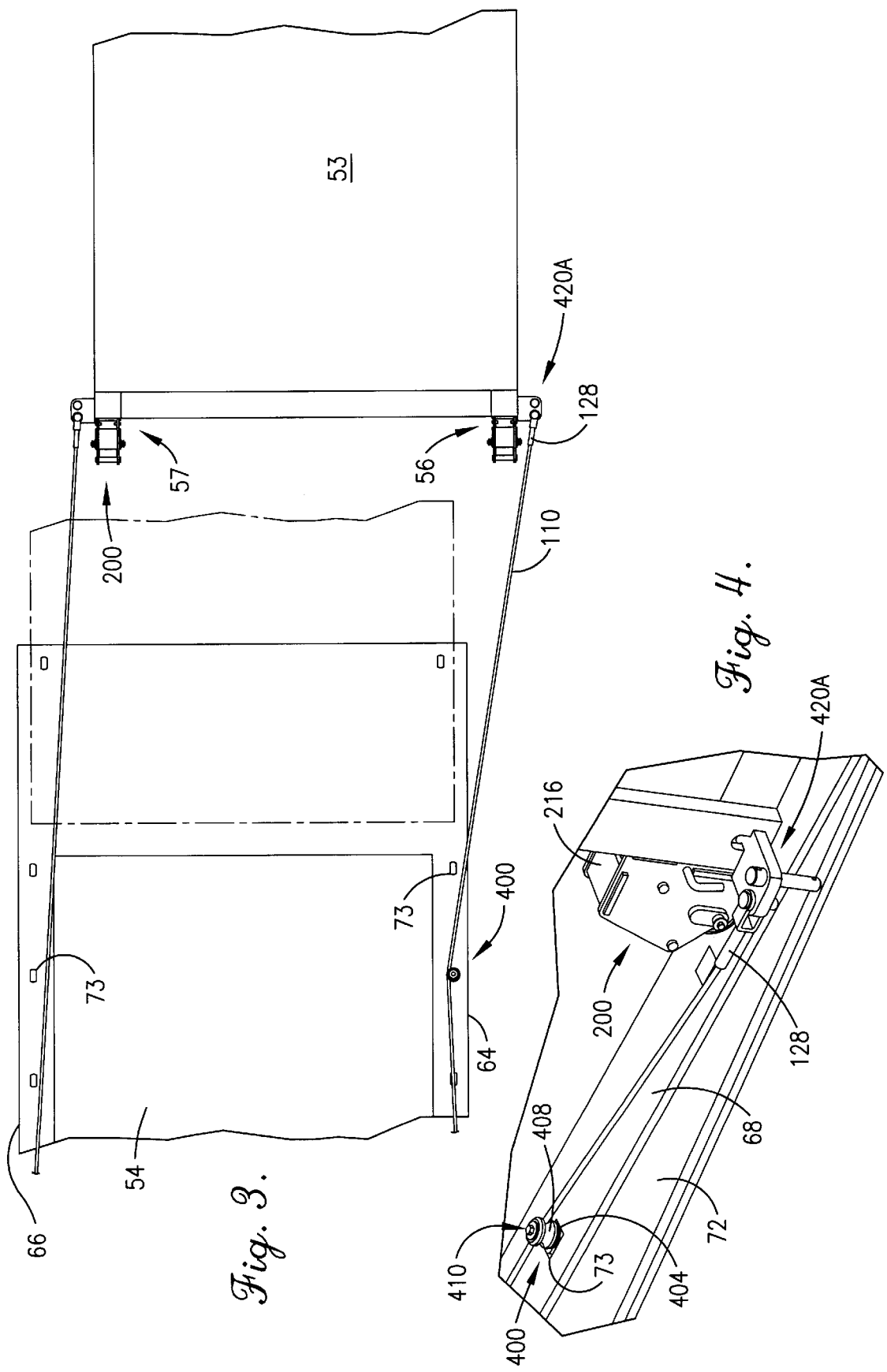

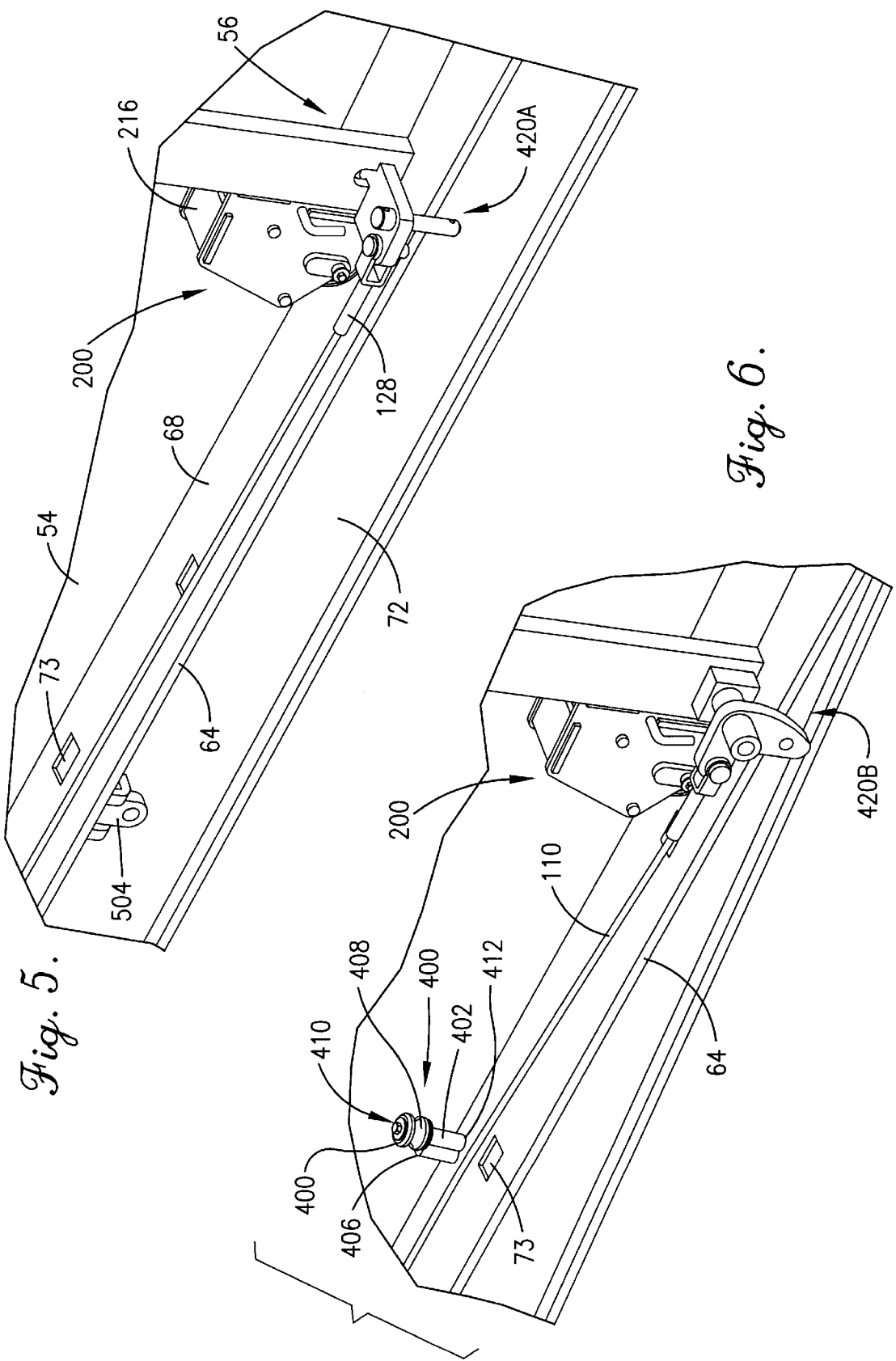

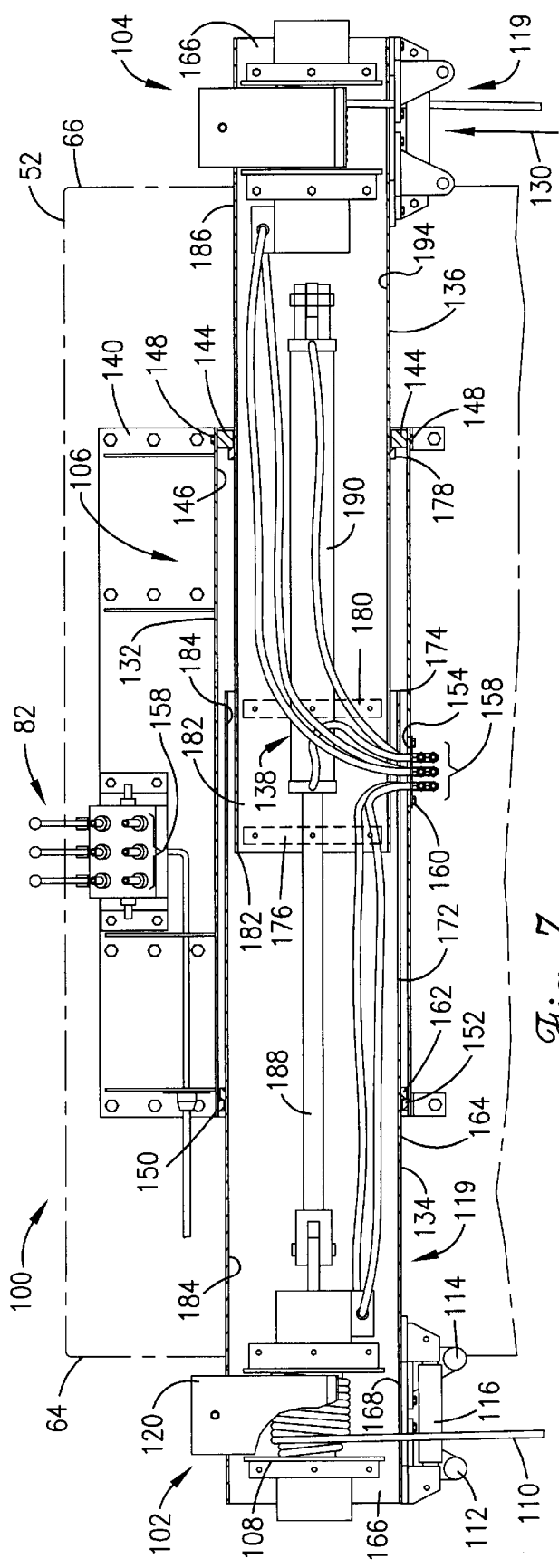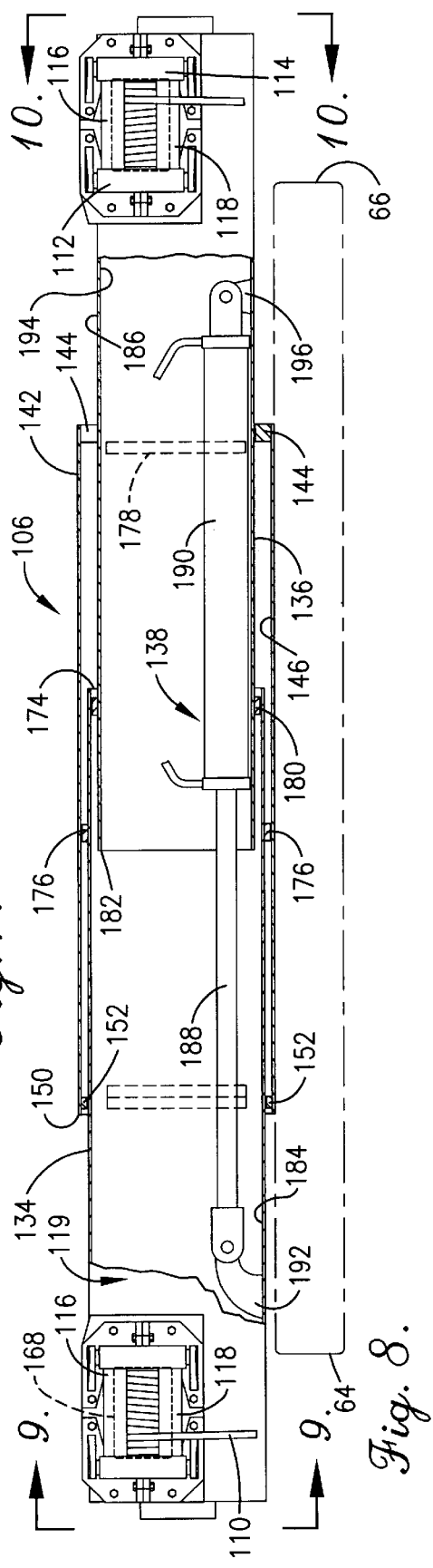

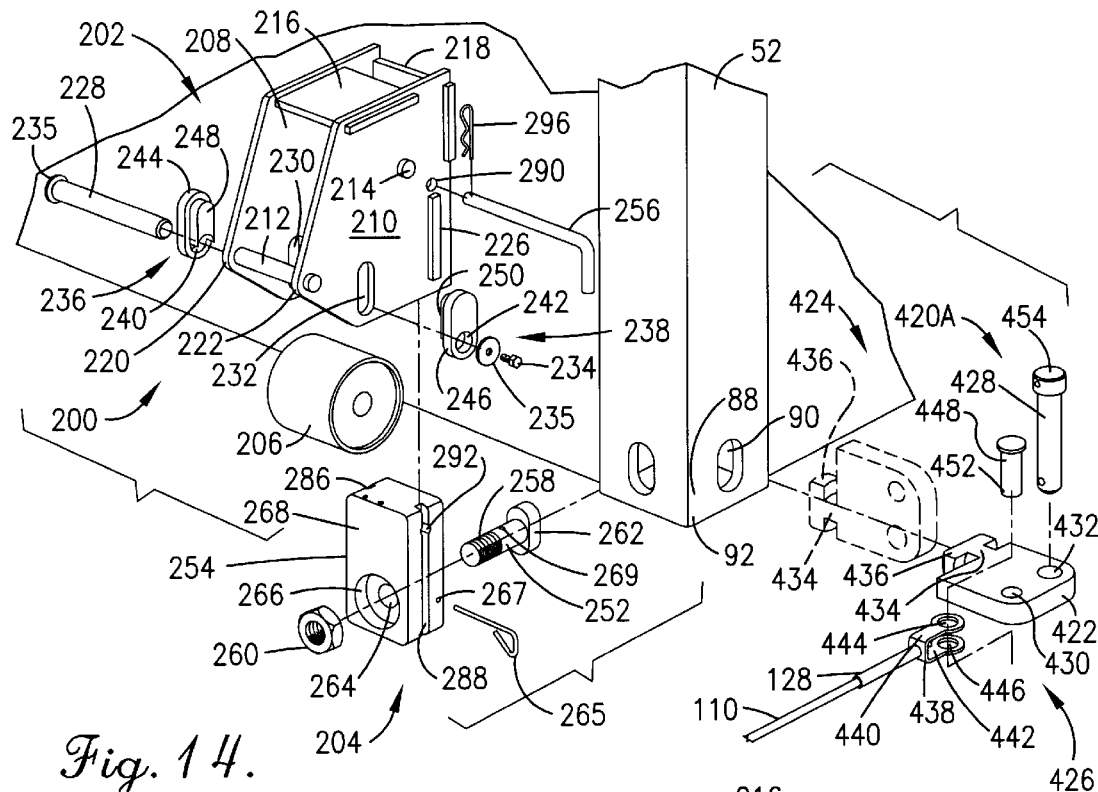
Fig. 14.
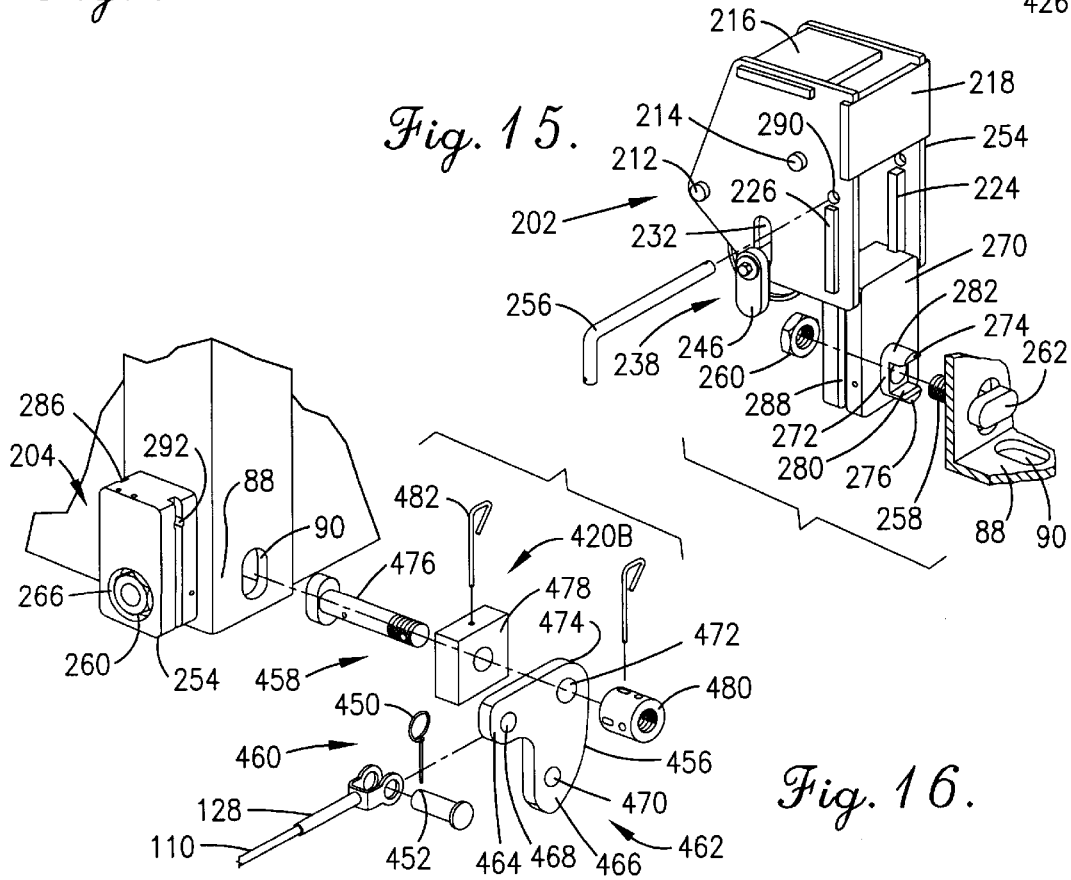
Fig. 15.
Fig. 16.

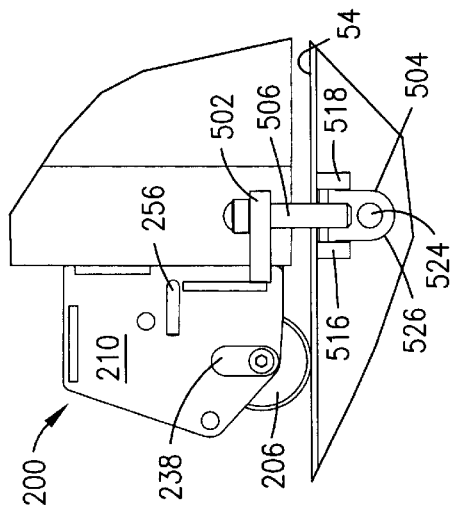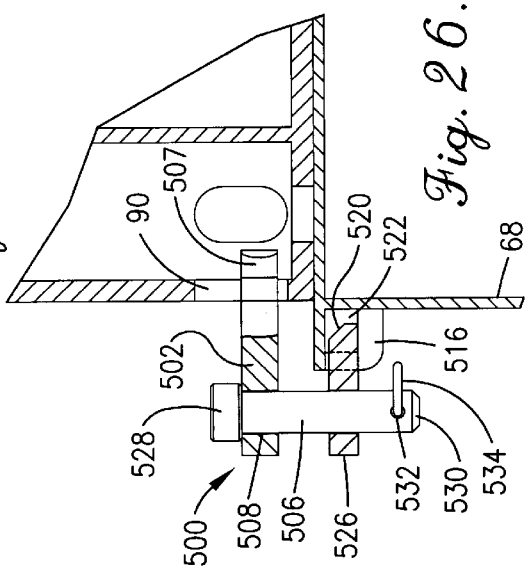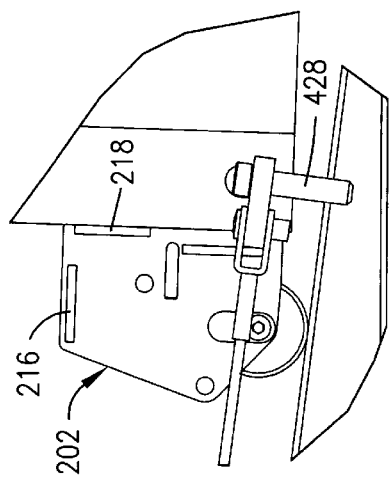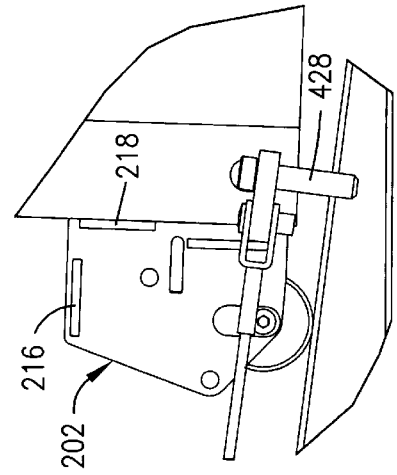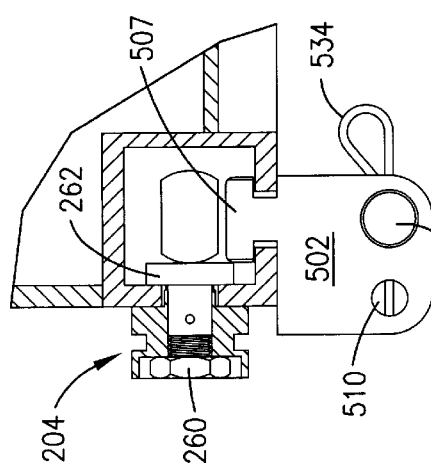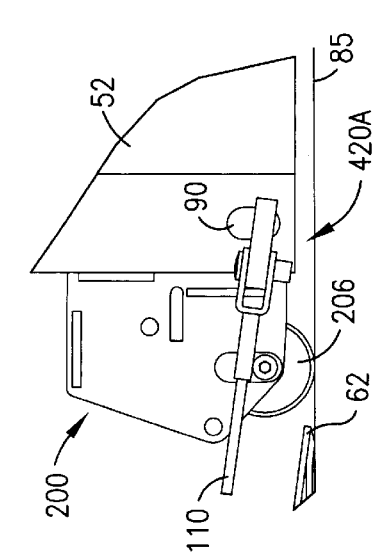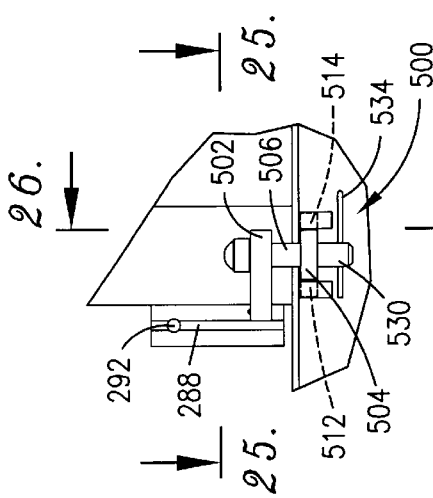

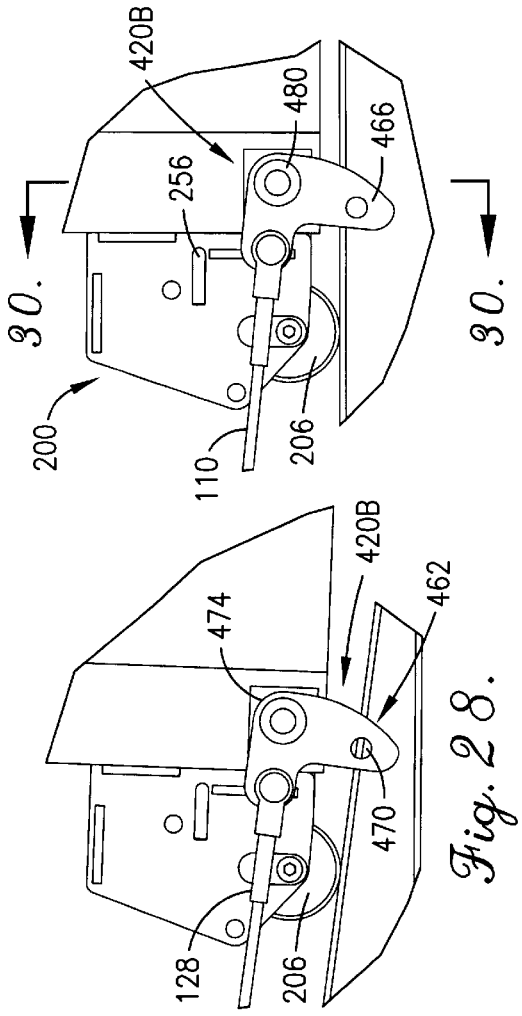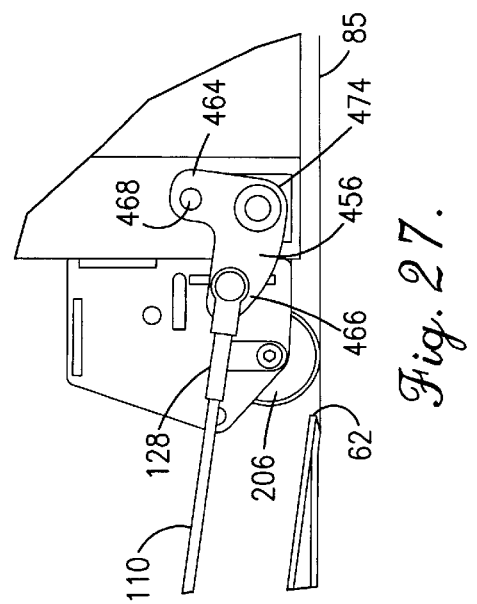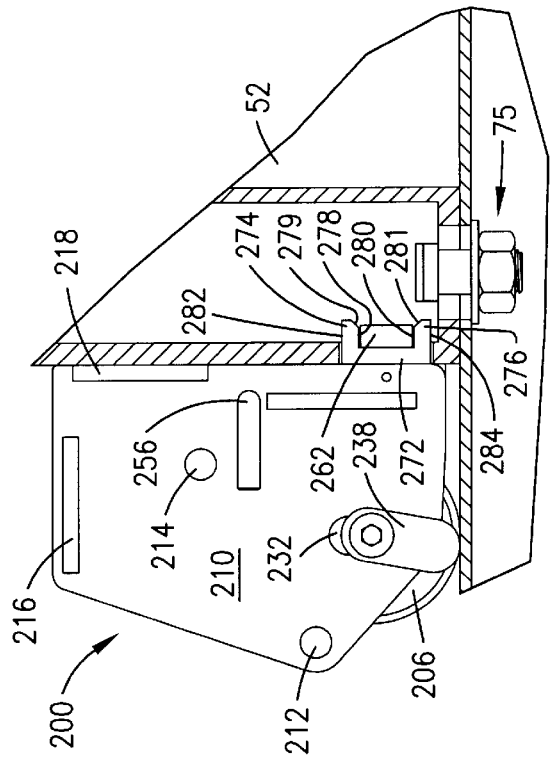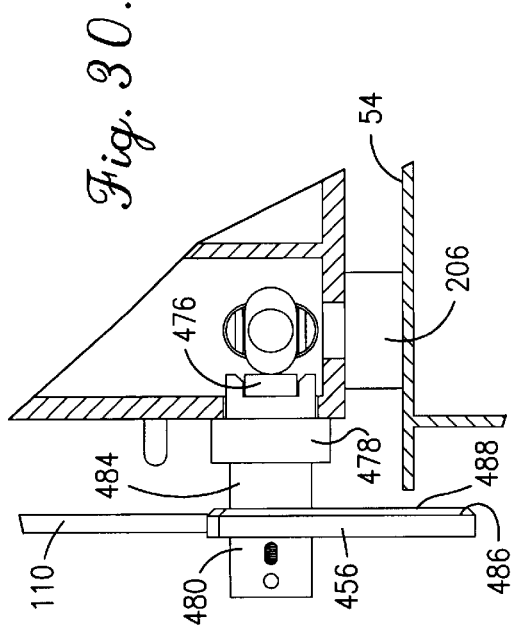

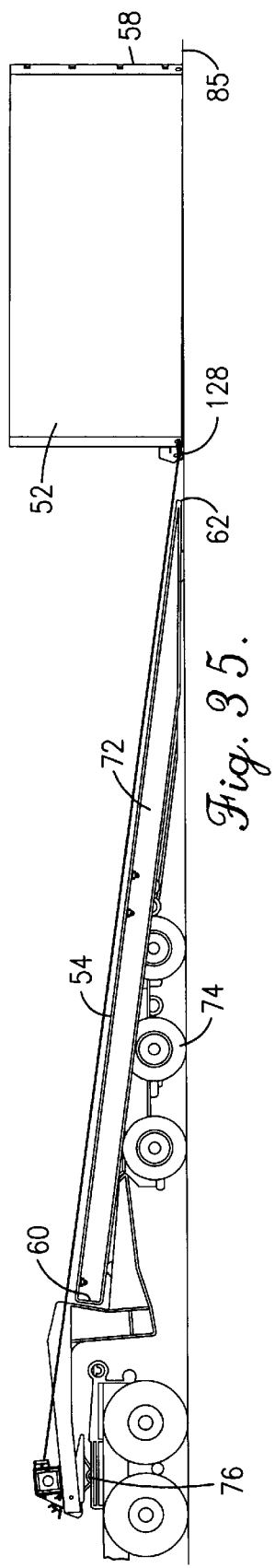
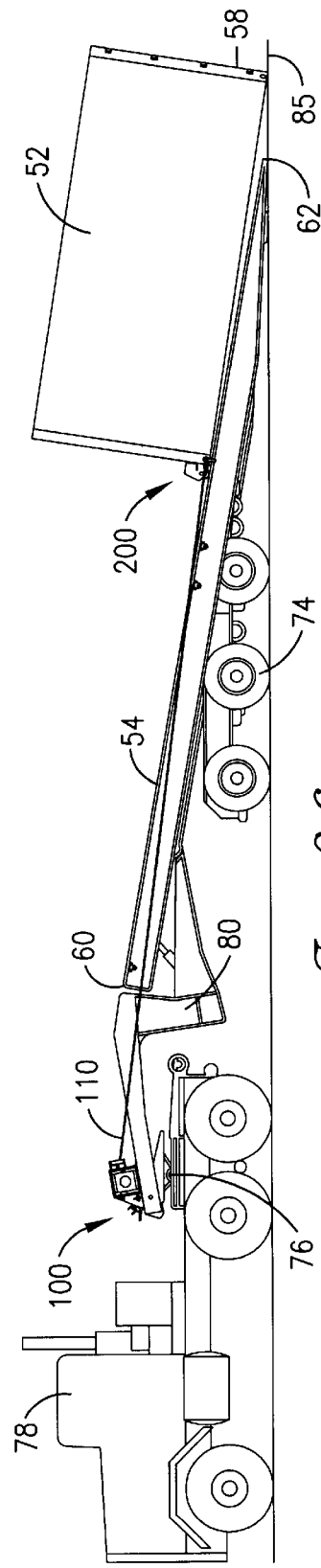
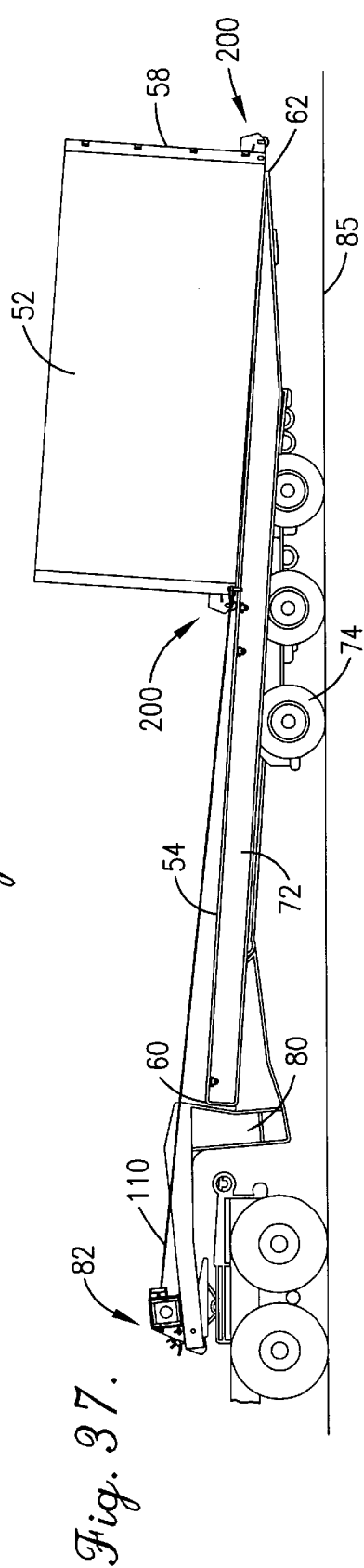
Fig. 35.
Fig. 36.
Fig. 37.

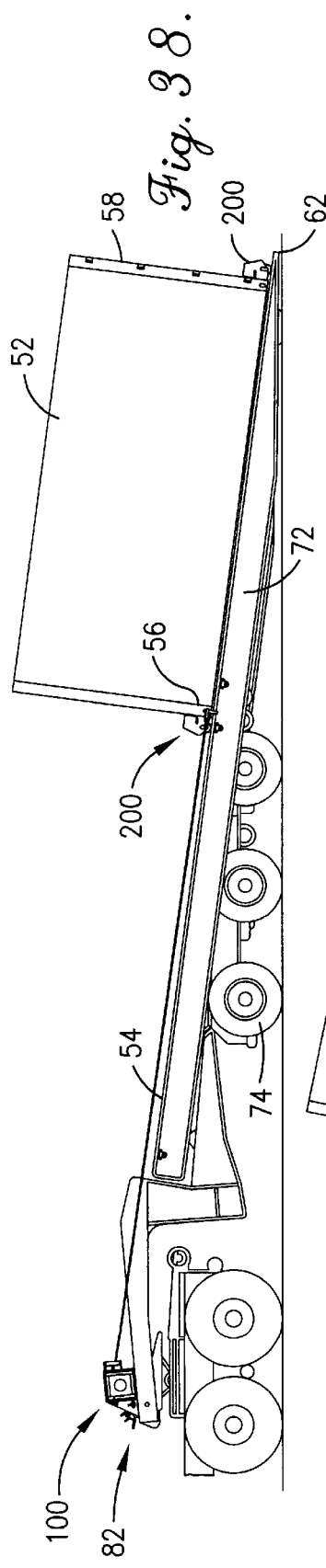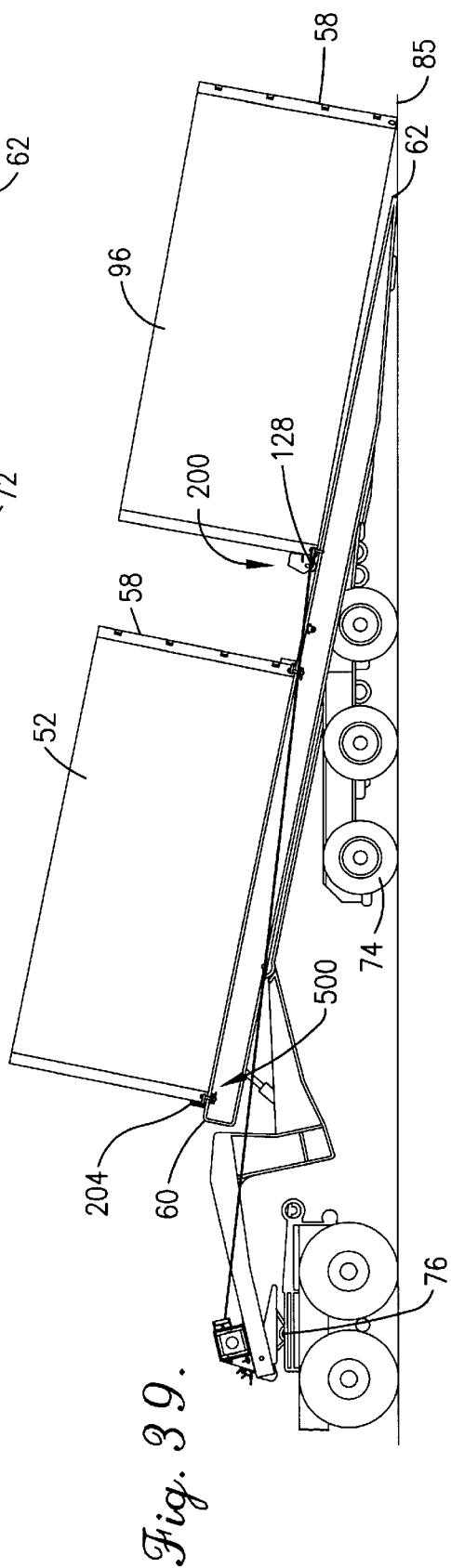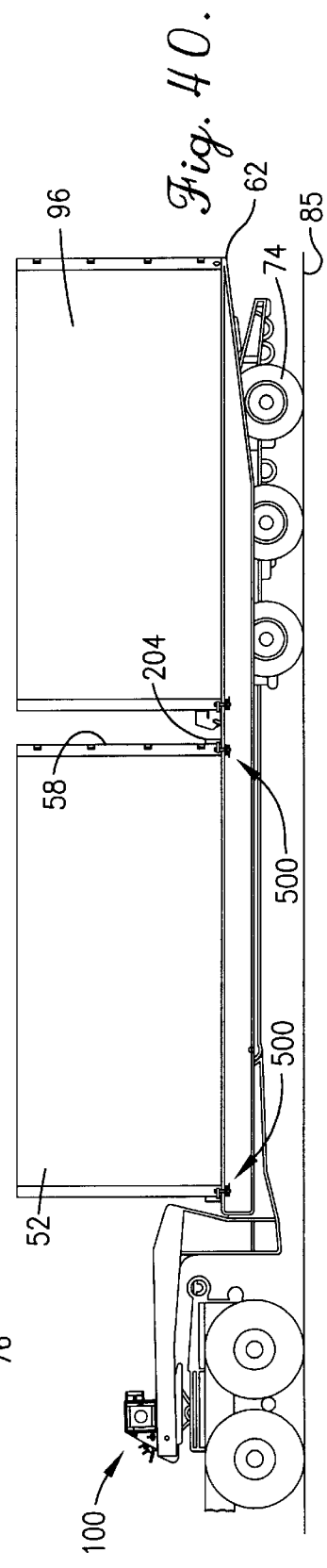

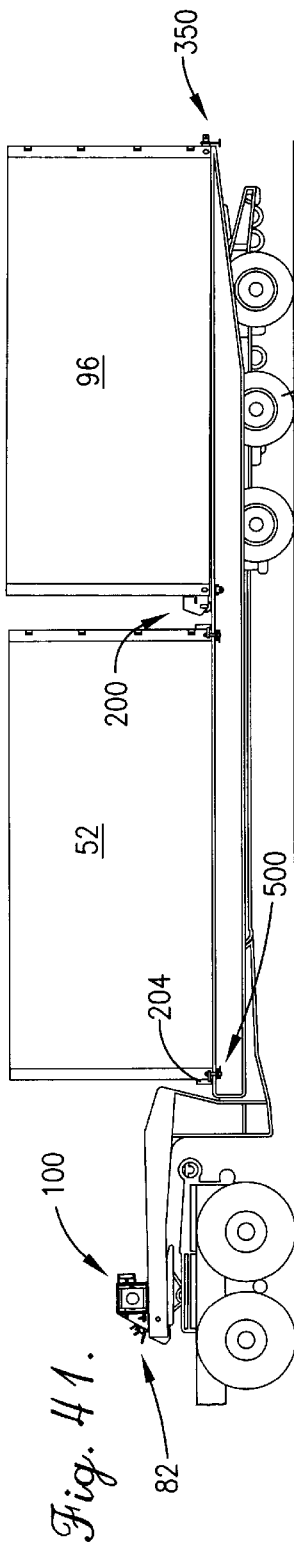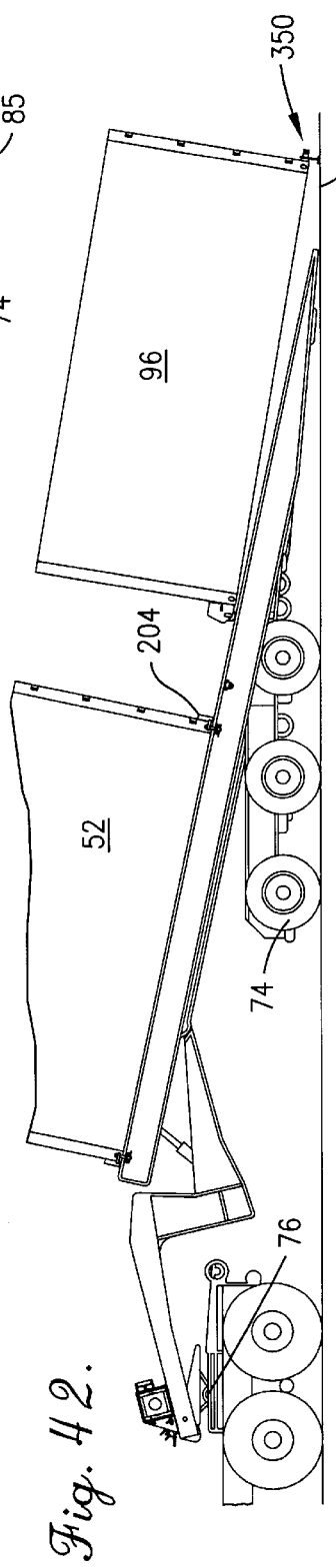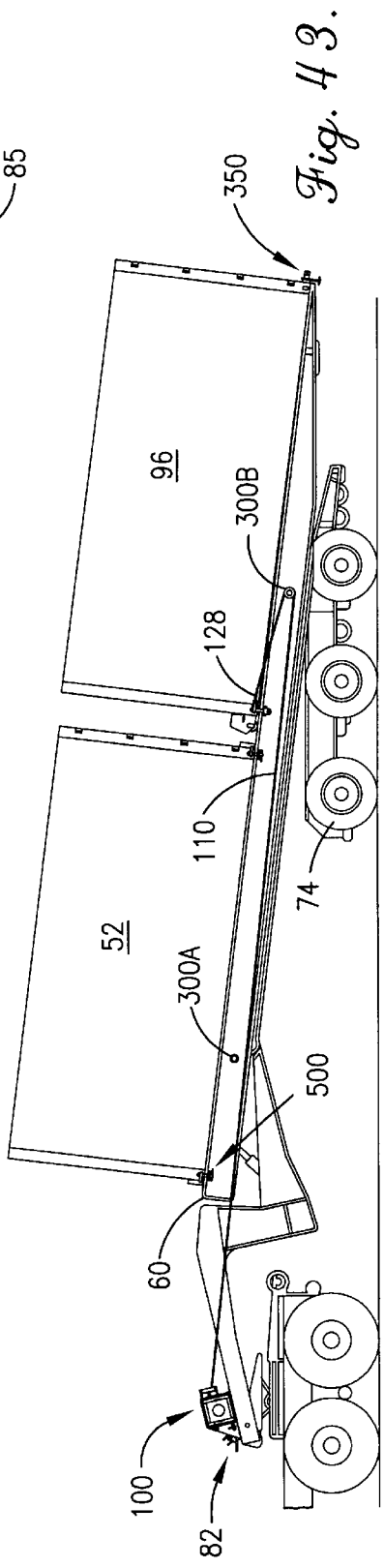

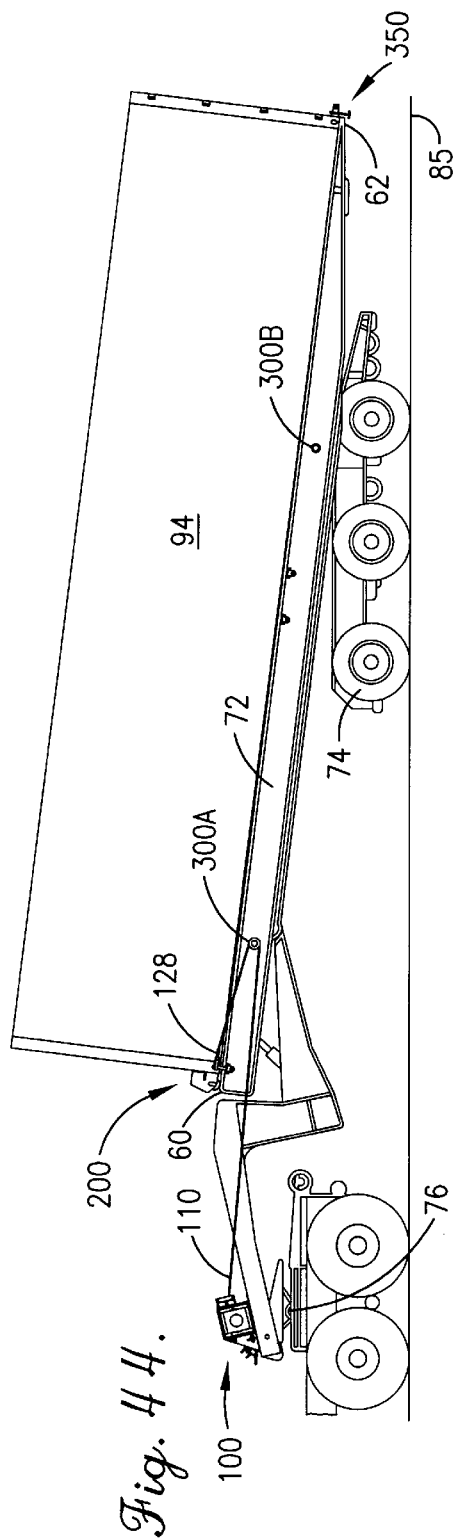
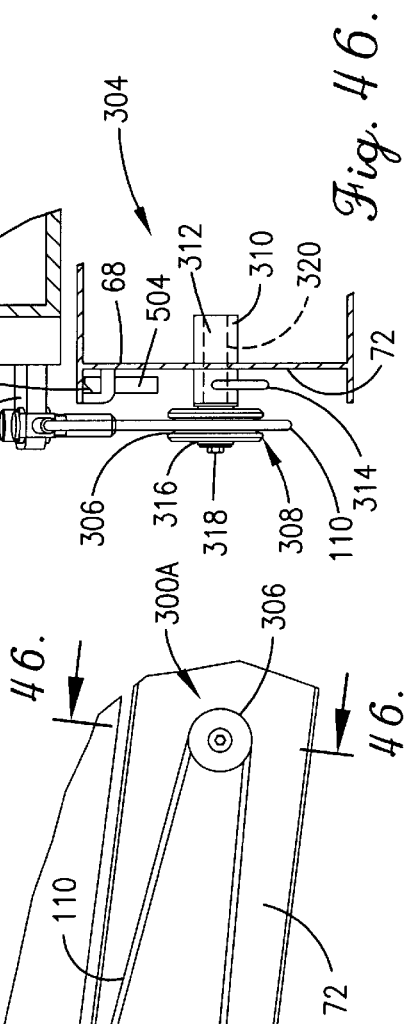
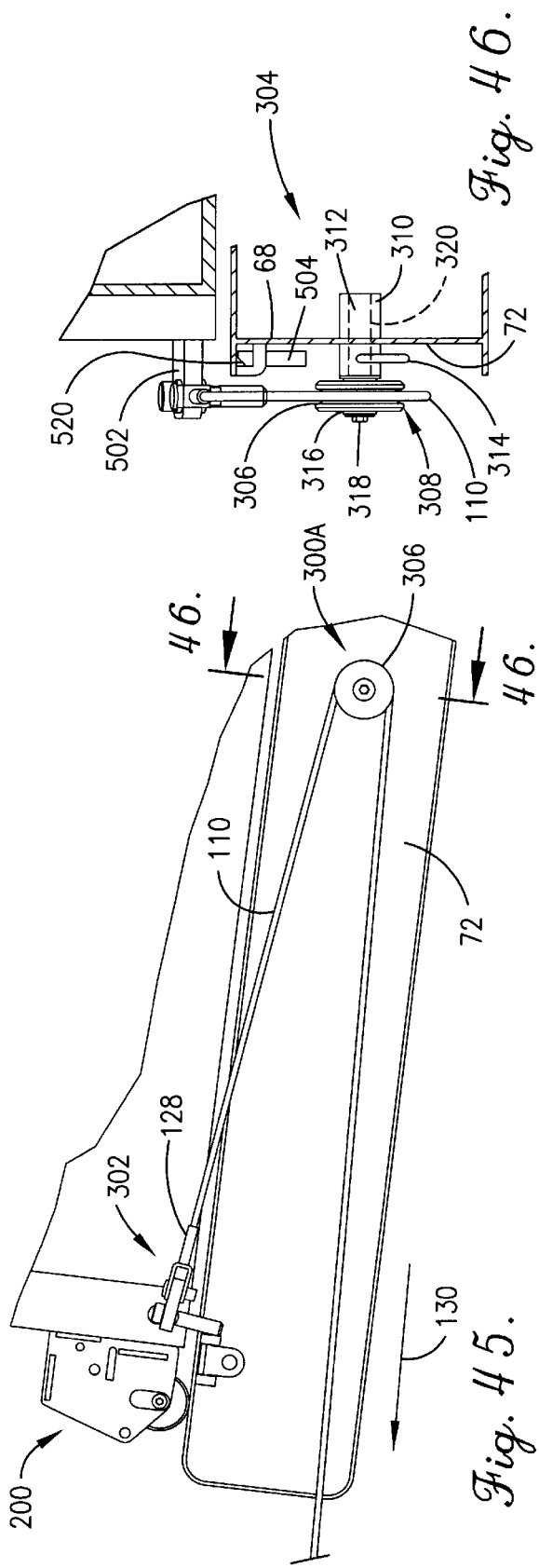

MULTI-PURPOSE, LOW-LOAD ANGLE TRAILER WITH LATERALLY EXTENDABLE WINCH ARMS

TECHNICAL FIELD

This invention relates to trailers and trailer accessories and, more particularly, to trailer and trailer accessories for loading, transporting, and off loading rectangular, International Standard Organization (ISO) containers having ISO corner fittings.

BACKGROUND

Containers made according to ISO standards are generally made in lengths of twenty and forty feet. Each container has eight corners, and each corner includes a corner fitting. The corner fittings include an opening on each of their three exposed faces. Various components are attached to the corner fittings to lift, move, load, lockdown, and off-load the ISO containers. These components are generally bulky, complex, expensive, and difficult to use requiring several people, or addition of extensive equipment, to perform a task such as loading, and the ground surface over which containers are being loaded or off-loaded is sometimes damaged. Further, the frequency of use and kinds of uses for ISO containers are continually increasing. For example, ISO containers are now used for anything from typical transportation and storage to mobile office space. Hence, the disadvantages of these components are becoming more acute and have greater cost significant every day.

Trailer loading and off loading components are of special significance. Containers are frequently loaded onto trailers when oriented at an angle to the trailer. The various trailer accessories currently available lack the ability to align ISO containers with the trailer, so that loading and off loading are overly time consuming and require two or more people to complete the task. Conventionally, trailers are provided with a single winch fixed at a central location near the front of the trailer. The single winch lacks the ability to align the container during loading and is unable to aide in performing other functions such as off loading. Substantial advancements have been made in tilting trailers to load/unload containers by shifting the undercarriage of the trailer as taught by U.S. Pat. Nos. 5,211,413 and 5,013,056 which are hereby fully incorporated herein by reference. However, these references generally do not address the problem of a container oriented at an angle to the trailer, and the undercarriage of a trailer can only be shifted so far.

Another problem is presented when loading two twenty foot containers on the same trailer. When the front twenty foot container has been loaded onto a trailer, the centrally located winch is not positioned to efficiently pull the rear twenty foot container onto the trailer behind the front container.

SUMMARY OF THE INVENTION

Accordingly, one important object of the present invention is to provide an improved winch assembly having an increased ability to align containers as they are loaded.

It is an additional important object of the present invention to provide improved methods of loading and off loading containers which reduce time and labor for loading and off loading.

It is also an important object of the present invention to provide an improved wheel assembly for moving of containers.

It is also an important object of the present invention to provide an improved method for raising and lowering containers on wheel assemblies.

It is another important object of the present invention to provide improved off loading pulleys for use with a winch assembly to off-load containers.

It is still another important object of the present invention to provide an improved off-load foot for off loading containers.

It is a further important object of the present invention to provide an improved cable guide for aligning containers as they are loaded.

It is a still further important object of the present invention to provide improved container guides for aligning containers as they are loaded and off loaded.

It is yet another important object of the present invention to provide an improved lockdown mechanism for holding containers in place after they are loaded.

In carrying out the foregoing and other objects, the present invention contemplates an improved trailer with an improved trailer winch assembly having a movable winch apparatus. A winch transport assembly operates to move the winch apparatus to a desired position, and a control mechanism is provided to operate the winch apparatus and control mechanism.

In a preferred embodiment, the winch transport assembly comprises an extendable arm with the winch apparatus attached to the winch arm adjacent an outer end of the winch arm. The winch arm is slidably received in a guide shell centrally located on the deck of the trailer. Preferably, a second winch apparatus is provided on a second winch arm slidably received in the guide shell to move the second winch assembly preferably in an opposite direction relative to the first winch assembly.

The present invention also contemplates an improved method for loading containers onto trailers. The winch apparatus is moved to a desired position, and a winch cable is connected to a front corner of the container. The winch apparatus is then activated to pull the deck under the container.

In a preferred embodiment, moving the winch apparatus comprises moving the winch apparatus beyond the side of the trailer deck. Also, a second winch apparatus is preferably moved by the transport assembly beyond the other side of the trailer deck. To load a second container, the winch cables of the two winch apparatus are connected to the front corners of the second container. With the winch apparatuses extended beyond the sides of the trailer deck, the cables extend beside the first container to pull the second container onto the trailer deck without interference from the first container. To further enhance the loading process, the trailer is initially rolled underneath the container which remains substantially stationary until it is almost entirely on the trailer.

The present invention further contemplates an improved wheel assembly for attachment to the corner fittings of ISO containers. The wheel assembly comprises a rigid wheel frame and a wheel rotatably and slidable supported in the wheel frame. The wheel frame slides between lowered and raised positions relative to the wheel, and an attachment assembly is utilized to attach the wheel frame to the corner fitting of the ISO container.

In a preferred embodiment, the wheel assembly includes a jack plate spaced apart from the wheel to define a jack receiving area between the wheel and the jack plate. The preferred embodiment also includes a lock block which is received into a lock slot of the wheel frame to hold the wheel frame in the raised position. The attachment assembly includes an attachment block onto which the wheel frame is slidably mounted for quick removal of the wheel frame from the attachment block.

The present invention still further contemplates an improved method for raising ISO containers with a jack and the wheel assembly. In the method, the jack is operatively positioned between the wheel and the jack plate, and the jack is activated to move the jack plate relative to the wheel. The lock block is then preferably inserted into the lock slot to hold the wheel in the raised position.

The present invention also contemplates an improved trailer including an inversion member. The winch cable extends around the inversion member and connects to the container to alter the pulling direction of the trailer winch apparatus. With the pulling direction of the winch apparatus changed, the winch apparatus operates to pull the container off the deck of the trailer.

In a preferred embodiment, the inversion member comprises a rotatable inversion pulley having a cable groove formed in its perimeter. Preferably, the inversion pulley is removably connected to a side flange of the deck and substantially inverts the pulling direction of the winch apparatus. The preferred embodiment further includes a second inversion member with the first and second inversion members being positioned at the same point along the length of the trailer. For unloading two twenty foot containers, third and fourth inversion members are preferably provided at a desired location along the length of the trailer different than the location along the length of the trailer for the first and second inversion members.

The present invention further contemplates an improved method for off loading containers from a trailer. In the method, the winch cable is extended around the inversion member, and the free end of the winch cable is removably attached to the container. The winch apparatus is then activated to pull the container off the deck of the trailer.

In a preferred embodiment utilizing two winch cables and where two twenty foot containers are located on the trailer, the winch cables are first extended around the first and second inversion members to off-load the rear container. Then the winch cables are extended around the third and forth inversion members to off-load the front container.

The present invention still further contemplates an improved off-load foot for use in loading an ISO container onto a trailer and in off loading an ISO container from a trailer. The off-load foot includes an attachment assembly for connection to a corner fitting of the ISO container, and a downwardly extending leg having an upper end connected to the attachment assembly and a ground end for engaging the ground surface.

In a preferred embodiment, the off-load foot also includes a base connected to the ground end of the leg. The edges of the base are turned up allowing the off-load foot to rock on the ground surface without damaging the ground surface.

The present invention also contemplates an improved method for off loading a container with the off-load foot. In the method, the off-load foot is attached to the corner fitting of the ISO container; the back end of the trailer is lowered until the ground end of the off-load foot securely contacts the ground surface lifting the end of the container off the back end of the trailer, and the trailer is pulled forward.

In a preferred embodiment, the back end of the trailer is lifted again, so that the off-load foot can be removed. After the off-load foot is removed, the back end of the trailer is lowered until the rear of the container contacts the ground surface, and then the trailer is pulled from underneath the container.

In another preferred embodiment, the preferred off-load foot is utilized during the last several feet of pulling a trailer with a cambered/arced deck under a 40 foot container, to keep from dragging the container bottom on the trailer. The rear of the trailer is lifted, and an off-load foot is attached to each rear corner of the container. The rear of the trailer is then lowered until the ground end of the off-load foot securely contacts the ground surface and lifts the rear of the container off the camber of the trailer. The trailer is then be pulled under the container to a loaded position.

The present invention also contemplates an improved cable guide in combination with a trailer having a winch apparatus and stake holes formed in the trailer deck. The roller guide includes a stake-hole post placed into one of the stake holes. With the stake-hole post in place, a guide portion of the cable guide is located above the deck and receives the winch cable to alter the pulling direction of the winch apparatus.

In a preferred embodiment, the guide portion is rotatably connected to the stake-hole post for rotation by the winch cable. Preferably, the guide portion is a circular disk with a cable receiving groove formed in its perimeter.

The present invention further contemplates an improved container guide for guiding and aligning a container especially during loading. The container guide includes an attachment mechanism for attaching a container guide body to the container and a winch cable attachment assembly for connecting a free end of the winch cable to the container guide body. The container guide also includes an elongated downwardly extending member having a length sufficient to extend below the surface of the deck and engage the sides of the deck.

In a preferred embodiment, the container guide body comprises two legs with one of the legs being the elongated member and the other leg having an aperture for attachment to a free end of the winch cable. Preferably, the elongated member also comprises an aperture for attachment to the free end of the winch cable, so that the container guide body is attachable in two configurations.

In another preferred embodiment, the attachment mechanism comprises a twist lock tab for locking in an opening of one of the corner fittings of the container. In this embodiment, the elongated member comprises a guide pin extending through a guide pin aperture in the container guide body. The pin is preferably cylindrical and rotatably received in the guide pin aperture.

The present invention still further contemplates an improved lockdown mechanism for holding a container on the trailer. The lockdown mechanism includes an attachment member for attaching to the container, a pivotal securement member for attaching to the deck and an extension member attached to both the attachment member and the securement member when the securement member is pivoted to a lockdown position. The securement member is preferably attached to an outer face of the side flange of the trailer deck, and the securement member preferably extends beyond the side flange to connect with the extension member. Thus, the extension member is positioned beyond the side flange of the deck.

In a preferred embodiment, the extension member comprises a substantially cylindrical pin extending through cylindrical openings in the attachment member and the securement member. Preferably, the extension member is substantially perpendicular to both the attachment member and the securement member. Further, a locking member is provided to hold the securement member in the lockdown position.

BRIEF DESCRIPTION OF THE DRAWINGS

FIG. 3 is a fragmentary, top plan view of a cable guide inserted in the trailer of FIG. 1 and illustrating the operation of the cable guide to align a container with the trailer;

FIG. 4 is a fragmentary perspective view of the cable guide of FIG. 3;

FIG. 5 is a fragmentary perspective view illustrating the operation of a container guide;

FIG. 6 is a fragmentary perspective view illustrating the operation of the cable guide of FIG. 3 and an alternate embodiment of a container guide;

FIG. 7 is a top view in partial cross-section of a winch assembly according to the present invention shown in an extended position;

FIG. 8 is a cable side view with partial cross section of the winch assembly of FIG. 7 shown in the extended position;

FIG. 14 is an exploded perspective view of a wheel assembly according to the present invention and the container guide of FIG. 5;

FIG. 15 is a partially exploded perspective view of the wheel assembly of FIG. 14;

FIG. 16 is an exploded perspective view of the alternate embodiment of the container guide assembly of FIG. 6;

FIG. 21 is a side view of the wheel assembly of FIG. 14 and illustrating the container being loaded;

FIG. 22 is a side view of the wheel assembly of FIG. 14 and illustrating the operation of the container guide of FIG. 5;

FIG. 23 is a side view of the wheel assembly and container guide of FIG. 14 and illustrating the loaded position of the container;

FIG. 24 is a side view of a lockdown mechanism according to the present invention;

FIG. 25 is a horizontal cross sectional view of the lockdown mechanism of FIG. 24 taken along line 25—25 in FIG. 24;

FIG. 26 is a vertical cross sectional view of the lockdown mechanism of FIG. 24 taken along line 26—26 in FIG. 24;

FIG. 27 is a side view of the container guide of FIG. 6 illustrating the container being loaded;

FIG. 28 is a side view of the container guide of FIG. 6 illustrating the operation of the container guide;

FIG. 29 is a side view of the container guide of FIG. 6 illustrating the loaded position of the container;

FIG. 30 is a vertical cross sectional view of the container guide of FIG. 16 taken along line 30—30 in FIG. 29;

FIG. 31 is a vertical, transverse cross sectional view illustrating the container in a lockdown position;

FIG. 35 is a side view illustrating the trailer loading operation;

FIG. 36 is a side view illustrating a subsequent step in the trailer loading operation;

FIG. 37 is a side view illustrating a further subsequent step in the trailer loading operation;

FIG. 38 is a side view illustrating another subsequent step in the trailer loading operation;

FIG. 39 is a side view illustrating still another subsequent step in the trailer loading operation;

FIG. 40 is a side view illustrating a trailer loaded with two twenty foot containers;

FIG. 41 is a side view illustrating the trailer off-loading operation;

FIG. 42 is a side view illustrating a subsequent step in the trailer off-loading operation;

FIG. 43 is a side view illustrating an alternate trailer off-loading operation utilizing inversion pulleys shown in FIGS. 45 and 46;

FIG. 44 is a side view illustrating the trailer off-loading operation for a forty foot container;

FIG. 45 is a fragmentary side view illustrating the operation of an off-load inversion pulley according to the present invention; and FIG. 46 is a vertical cross section of the inversion pulley of FIG. 45 taken along line 46—46 in FIG. 45.

DETAILED DESCRIPTION

Introduction

Figure 1:
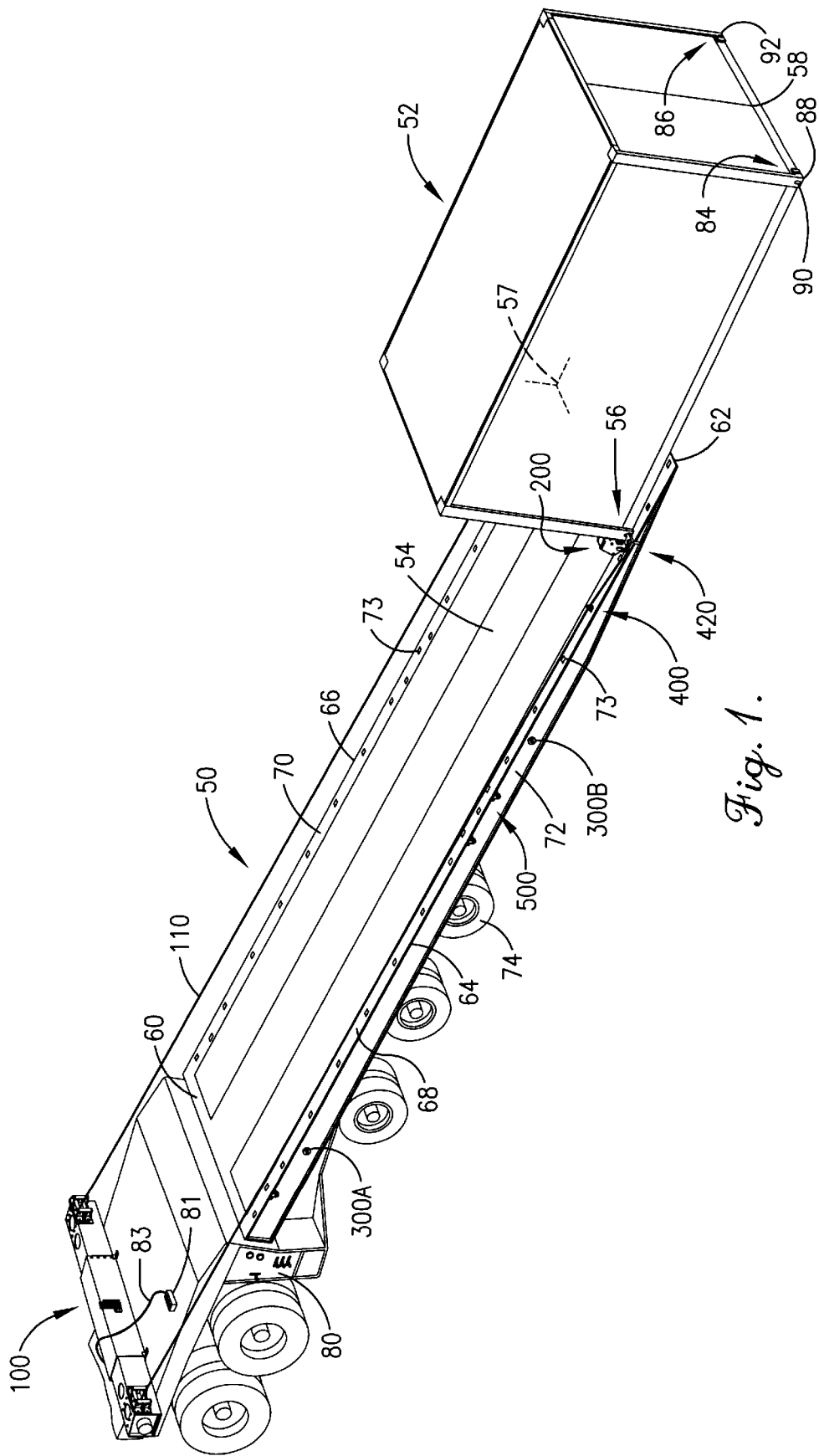
FIG. 1 is a perspective view of a trailer including features according to the present invention.

Referring to the drawings in greater detail, the trailer 50 shown in FIG. 1 includes a winch assembly 100 for loading an ISO container 52 onto the deck 54 of the trailer. Wheel mechanisms 200 are attached to at least the lower front corners 56, 57 of the container 52 allowing the trailer to roll under the container. The trailer 50 is also provided with inversion pulleys 300A, 300B for off loading the container, and an off-load foot 350 (FIG. 32) is provided for connection to the rear 58 of the container to aide in off loading. A cable guide 400 and a container guide 420 are provided to align the container during loading, and a lockdown mechanism 500 (FIG. 24) is provided to hold the container in place on the trailer.

Trailer and Container

Figure 2:
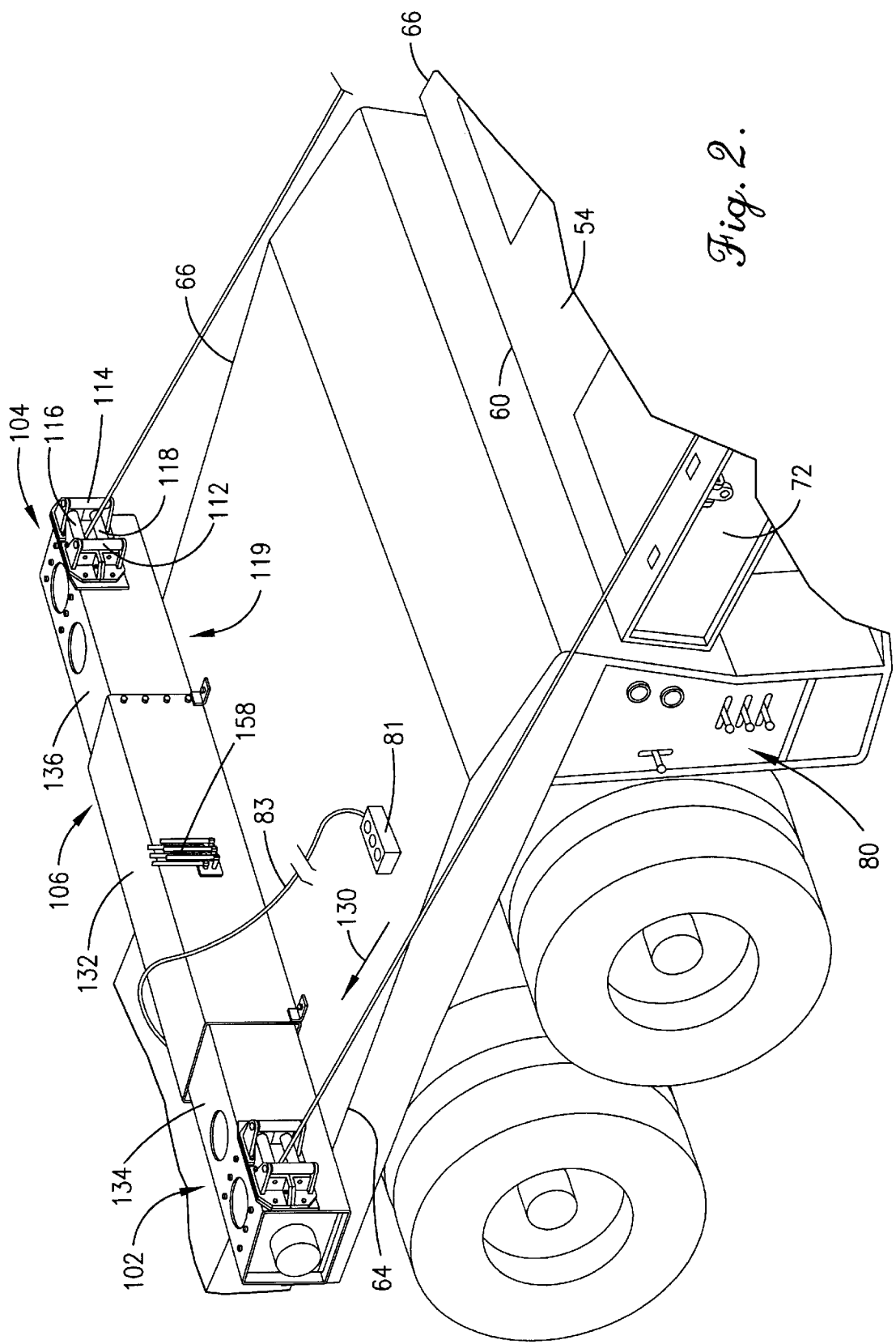
FIG. 2 is a fragmentary, enlarged perspective view of a front end of the trailer of FIG. 1.
Figure 9:
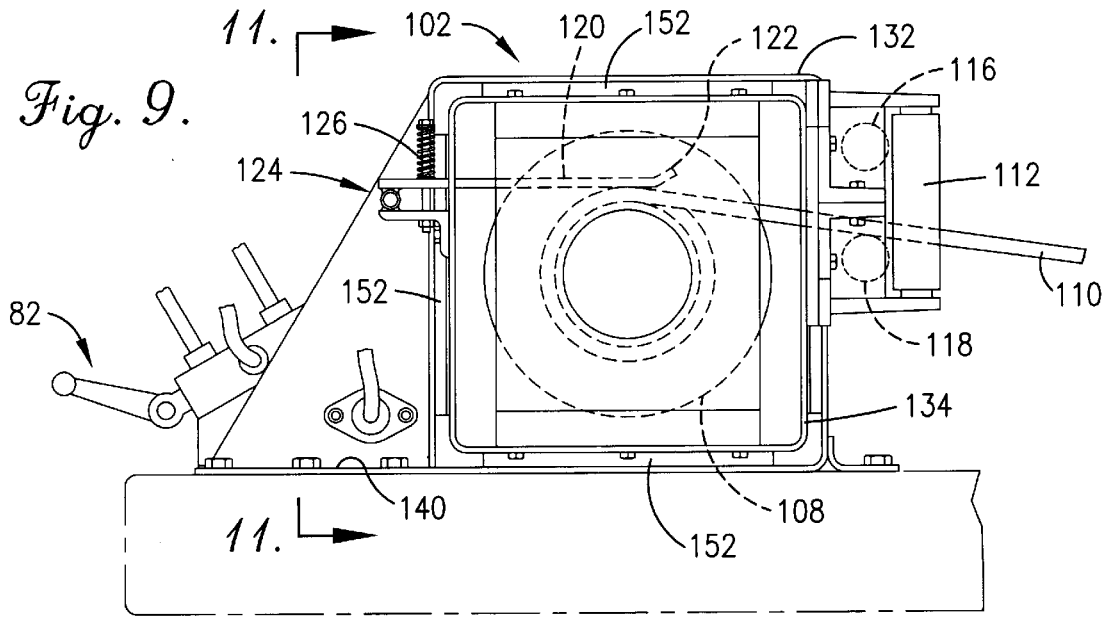
FIG. 9 is an end view of the winch assembly of FIG. 7 taken from the perspective of line 9—9 in FIG. 8.
Figure 10:
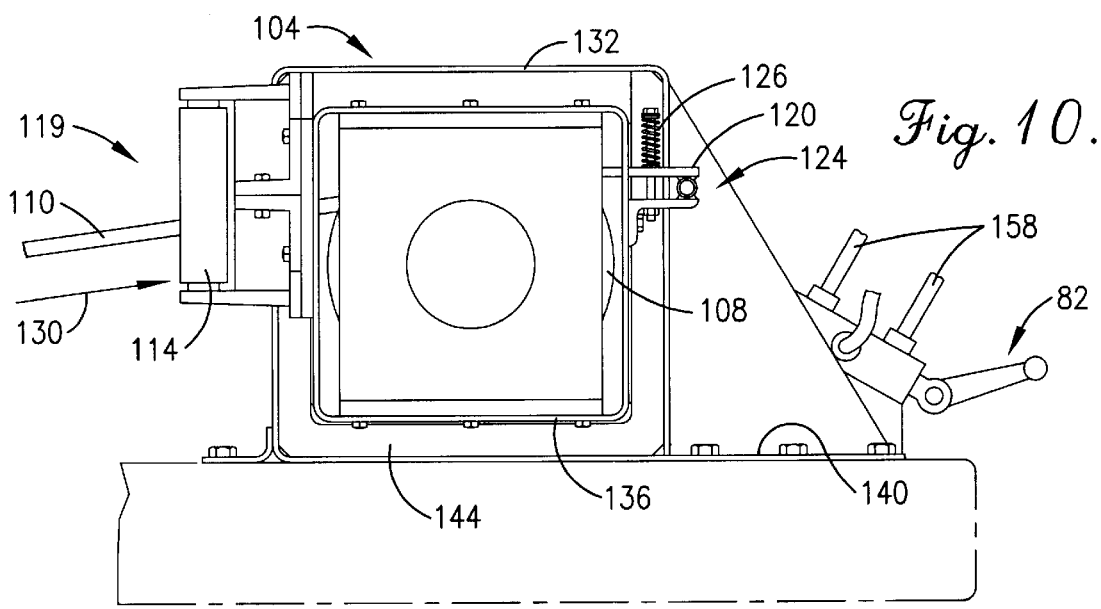
FIG. 10 is an opposite end view of the winch assembly of FIG. 7 taken from the perspective of line 10—10 in FIG. 8.
Figure 11:
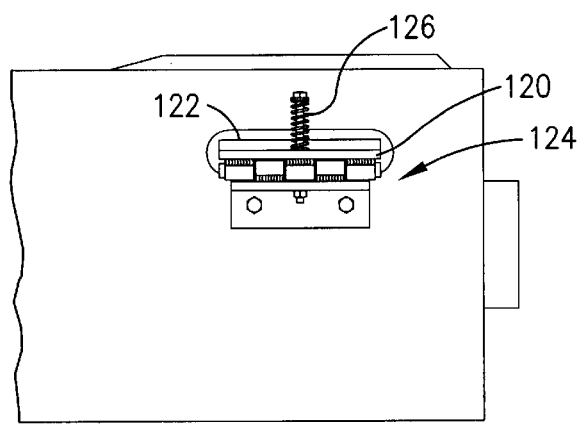
FIG. 11 is a fragmentary front view of the winch assembly of FIG. 7 taken from the perspective of line 11—11 in FIG. 9.
Figure 12:
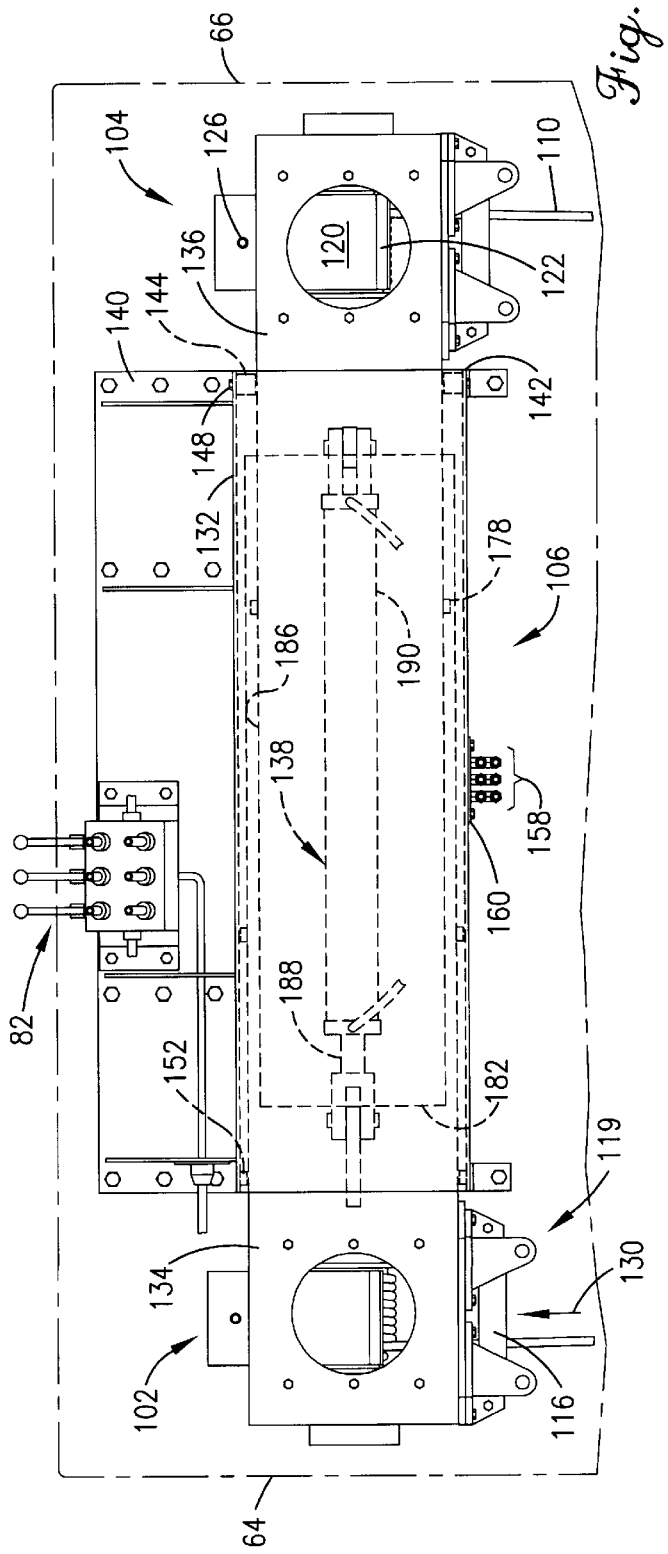
FIG. 12 is a top view of the winch assembly of FIG. 7 shown in a retracted position.
Figure 13:
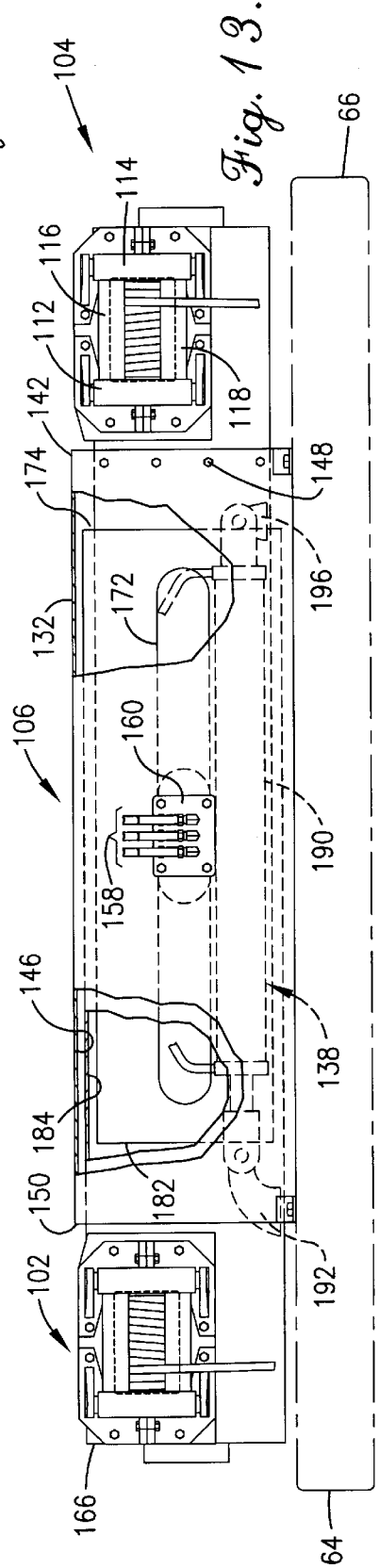
FIG. 13 is a cable side view of the winch assembly of FIG. 7 having portions removed for illustration and shown in the retracted position.

Referring to FIGS. 1 and 2, the standard components of the trailer 50 will be described to the extent necessary for an understanding of the inventive features disclosed herein. The trailer includes a substantial flat deck 54 having a length extending between a front end 60 and a back end 62. The deck is substantially flat in that it has a small camber or arc from front 60 to back 62. The trailer also has a width extending between a first side 64 and a second side 66. Each side of the trailer has a side flange 68, 70 with an outer face 72 and a plurality of stake holes 73. The trailer also has a plurality of wheels 74 rotatably coupled with the deck 54 to support and transport the deck. The trailer also includes a hitch assembly 76 (FIG. 36) for connection to a towing vehicle 78 (FIG. 36). The hitch assembly is positioned adjacent to the front end of the deck, and the wheels are movable relative to the deck as taught in U.S. Pat. Nos. 5,211,413 and 5,013,056. A control mechanism 80, 82 operates to selectively control the functions of the trailer with the trailer control 80 raising and lowering the back end 62 of the trailer and the winch assembly control 82 (FIG. 7) for selectively activating the winch assembly 100. The winch assembly control 82 also includes a remote control 81 on a cable 83 that is long enough to extend to the back end 62 of the trailer 50.

The container 52 is an ISO container having opposed lower front corners 56, 57 and opposed lower rear corners 84, 86. Each corner is provided with a corner fitting 88, shown schematically in some drawings, having a slot shaped opening 90 with rounded ends on each of the three exposed faces 92. The container 52 is approximately twenty feet in length, and forty foot containers 94 (FIG. 44) are also provided. Thus, each ISO container has four lower corners with corner fittings for the attachment of components to load, off-load, and lockdown the container.

Winch Assembly and Operation

Referring to FIG. 2, the winch assembly 100 includes a first movable winch apparatus 102 and a second movable winch apparatus 104 operable to apply force to the container 52. The first and second winches are mounted on a transport assembly 106 that is centrally attached to the trailer near the front of the deck 54.

The two winches 102, 104 are adapted for left hand and right hand rotation and are preferably hydraulic. The winches are otherwise substantially identical and will be described with reference to only one winch with identical reference numerals identifying the similar features of the winches. Referring additionally to FIGS. 7 through 13, the winch includes a cable spool 108 and a winch cable 110 which is wound around the cable spool. The winch cable extends from the winch apparatus through four roller guides 112, 114, 116, 118 on the cable side 119 of the winch assembly. The vertical roller guides 112, 114 restrict the movement of the cable in the horizontal direction and the horizontal roller guides 116, 118 restrict the movement of the cable in the vertical direction. The winch also includes a guide plate 120 having an upturned end 122 for progressively layering the cable as it is wound onto the spool 108. The plate 120 is hingably connected by a hinge connection 124 relative to the spool and is biased with a spring 126 against the cable. The winch can be released by the winch controls 82, so that the cable can be withdrawn from the winch and have its free end 128 (FIG. 16) attached to a desired component. The winch is activated to retract the cable 110 in a pulling direction, indicated by arrow 130, toward the winch and wind it on the spool 108.

The transport assembly 106 includes a guide shell 132, a first extendable winch arm 134, a second extendable winch arm 136, and an actuating member 138. The guide shell is rectangular, preferably substantially square, in cross section and is fixedly mounted on the trailer 50 with a mounting assembly 140 in a central location across the width of the trailer and adjacent to the front 60 of the deck 54 and the front of the trailer 50. A first end 142 of the guide shell includes a large stop 144 attached to the inner surface 146 of the guide shell with conventional fasteners 148. Preferably, the stop is U-shaped but can extend around the entire inside circumference of the guide shell. The stop 144 operates to center the second arm 136 in the guide shell. The second end 150 of the guide shell is provided with a small stop 152 which is preferably located on all four internal sides of the guide shell 132 and is split into four parts. A feed line opening 154 (FIG. 7) is formed in the cable side 119 of the guide shell to receive hydraulic lines 158 from the control mechanism 82. A mounting plate 160 is attached to the cable side 119 to hold the lines in place and permit the extendable winch arms 134, 136 to slide around the lines 158.

The first extendable arm 134 is also substantially square in cross section and is smaller than the guide shell, so that it is slidably received inside the guide shell. The first arm also has a stop 162 positioned on the outer surface 164 for engaging the small stop 152 of the guide shell thereby limiting the extension of the first arm 134. The stop is preferably bifurcated into two parts which are placed on the opposite sides of the first arm and extend across substantially the entire height of the first arm. The first winch 102 is fixedly attached inside the first arm adjacent to the outer end 166 of the first arm. The outer end 166 is adjacent the side 64 of the trailer. A cable opening 168 is formed in the cable side 119 through which the cable 110 extends. The roller guides 112–118 surround the opening and are fixedly mounted to the cable side 119 of the first arm 134. The cable side 119 of the first arm also includes a hydraulic line slot 172 through which the hydraulic lines 158 extend. The slot 172 is of sufficient length to allow the arm to fully extend and fully retract without the ends of the slot contacting the hydraulic lines. The inner end 174 of the first arm is opposite the outer end 166 and has a spacer 176 on the upper and lower outer surfaces. The spacer 176 is preferably bifurcated into two parts which extend across substantially the entire width of the first arm. The spacer 176, in cooperation with the stop 162, slides against the inner surface 146 of the guide shell to center the first arm inside the guide shell.

The second extendable arm 136 has features substantially identical to the first extendable arm which are identified by identical reference numerals. The second arm is substantially square in cross section and is smaller than the first arm, so that the second arm is slidably received inside the first arm. The first arm, second arm, and guide shell are all parallel. The second arm has a bifurcated stop 178 on the sides of the arm and a bifurcated spacer 180 (FIG. 8) adjacent to the inner end 182 of the second arm. The bifurcated stop 178 contacts the large stop 144 to limit extension of the second arm 136. The bifurcated spacer 180 engages the inner surface 184 of the first arm, and the large stop 144 of the guide shell engages the outer surface 186 of the second arm to center the second arm within the guide shell and within the first arm while allowing the second arm to slide relative thereto. The outer end 166 of the second arm is adjacent the other side 66 of the trailer.

The actuating member 138 preferably comprises a hydraulic cylinder. The hydraulic cylinder comprises an elongated piston 188 and an elongated cylinder housing 190 in which the piston is slidably received. The cylinder is housed inside of the first and second arms 134, 136 with the piston being attached to the lower portion of the inner surface 184 of the first arm with a fixed connection 192. The cylinder housing 190 is attached to the inner surface 194 of the second arm 136 with a fixed connection 196.

In operation, the winch control 82 is operated to extend the arms 134, 136 and attached winches 102, 104 in opposite directions away from the center of the trailer and away from each other until the winches extend beyond the respective sides 64, 66 of the deck 54. Thus, when a winch is moved, it is always moved away from one of the sides and preferably in a direction parallel to the width of the trailer.

Referring to FIGS. 38–40, in loading two twenty foot containers the winches are moved apart and the winch cables are first connected to the opposed front corners 56, 57 of the front container 52 and the winches are activated to pull the front container substantially all the way forward on the deck 54. The free ends of the cables are then removed from the opposed front corners 56, 57 of the front container 52 and are attached to the opposed front corners of the rear container 96. The winches are then activated again to pull the trailer under the rear container 96. The extendable winches allow the cables to extend on either side of the front container, so that the front container does not interfere with loading of the rear container 96. After the containers are loaded, the winch arms are retracted toward the center of the trailer, so that the winches are between the sides of the trailer.

Wheel Assembly and Operation

Referring to FIGS. 14 and 15, the wheel assembly 200 comprises a wheel frame 202, an attachment assembly 204, and a wheel 206. The wheel is rotatably mounted in the wheel frame 202, and the attachment assembly 204 attaches the wheel frame 202 to the corner fitting 88 of the container 52.

The wheel frame 202 comprises opposed vertical side walls 208, 210 joined by support rods 212, 214, a jack plate 216, and a rear plate 218. The opposed side walls are preferably parallel and have outward protrusions 220, 222 through which the front support rod 212 extends. The second support rod 214 is generally centrally located in the side walls and is positioned to center a jack 298 over the wheel 206. The jack plate 216 is positioned adjacent to the top ends of the side walls and is preferably oriented in a horizontal plane. The rear plate 218 is positioned adjacent to the top ends of the side walls at the rear of the side walls and it is preferably oriented in a vertical plane. The side walls 208, 210 also include slide tabs 224, 226 adjacent to the rear and bottom ends of the side walls. The slide tabs are generally rectangular and extend into the space between the two side walls. Preferably, the slide tabs 224, 226 are elongated in a vertical plane.

The wheel 206 which is preferably made of a hard metal, is rotatably and slidably mounted between the two side walls 208, 210 by a wheel shaft 228 extending through lock slots 230, 232 in the opposite side walls. The shaft 228 is secured with conventional fasteners 234 and washers 235 at each end of the shaft. A pair of lock blocks 236, 238 each have an aperture 240, 242 through which the shaft 228 extends. The lock blocks slide axially on the shaft, and the washers are sized to prevent the lock blocks from coming off the shaft. The lock blocks are preferably positioned outside of the side walls and are free to pivot around and slide on the shaft between the side walls and the washers. The lock blocks 236, 238 also include outer grasping portions 244, 246 which are sized so that they will not pass through the lock slots 230, 232. The lock blocks further include inner portions 248, 250 sized to fit into the lock slots with minimal clearance for hand insertion and removal. The inner portions together with the shaft fill the lock slots.

The attachment assembly 204 includes a fastener 252, an attachment block 254, and a locking member 256. The fastener comprises a threaded end 258 for threaded engagement with a nut 260 and an elongated head 262 sized to fit through the opening 90 in the corner fitting 88 when the fastener is held in the orientation shown. When the orientation of the fastener is rotated 90° it cannot pass through the opening 90 as illustrated in FIG. 25. A pin 265 is also preferably used to hold the fastener in place while the attachment block is being connected to the corner fitting 88. The pin extends through small openings 267, 269 in the attachment block and fastener respectively.

Referring additionally to FIG. 31, the attachment block 254 comprises an aperture 264 for receiving the fastener 252 and a recess 266 on its outer side 268 to receive the nut 260. The inner side 270 has a fastener head engagement collar 272 which keeps the fastener head from rotating during tightening. The collar 272 is generally U-shaped and includes upper and lower legs 274, 276 having flat inner faces 278, 280 for engaging the fastener head 262 and curved outer faces 282, 284 which fit between the fastener head and the ends of the opening 90 to fill the opening 90 whereby the attachment assembly 204 is substantially fixed from moving relative to the ISO container 52. Each leg also includes a chamfer 279, 281 for easier engagement with the fastener head 262.

The attachment block 254 also includes opposed outward facing slide channels 286, 288 which form a slide connection with the slide tabs 224, 226 allowing the wheel frame to slide up and down relative to the attachment block 254. The wheel frame 202 is held in place relative to the attachment block by the locking member 256 which extends through a pair of apertures 290 in the side walls and through a cylindrical hole 292 in an upper portion of the attachment block. The slide tabs and apertures 290 are all preferably aligned in the same vertical plane. A safety pin 296 is provided to prevent the locking member 256 from being inadvertently removed.

Figure 17:
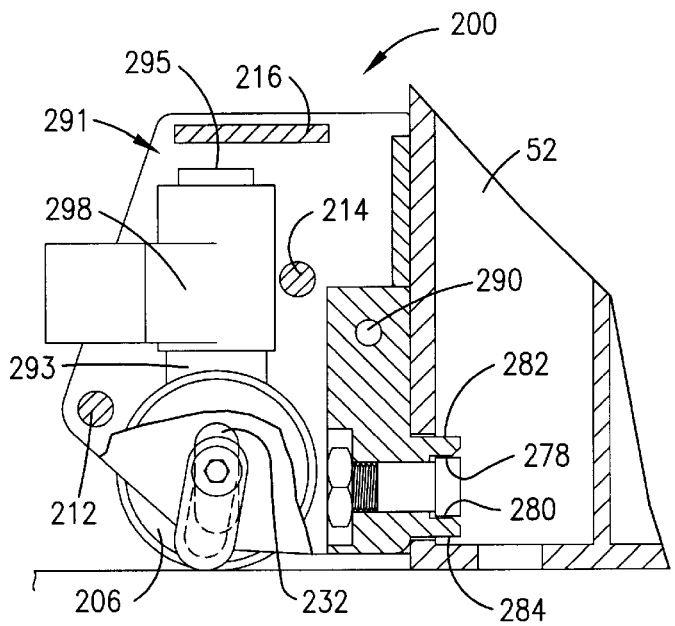
FIG. 17 is a side view in partial cross section of the wheel assembly of FIG. 14 illustrating the wheel assembly in a lowered position and placement of a jack in the wheel assembly.
Figure 18:
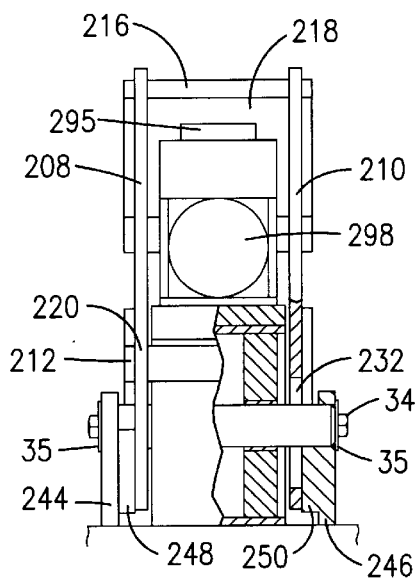
FIG. 18 is a front view in partial cross section of the wheel assembly of FIG. 14 in the lowered position.
Figure 19:
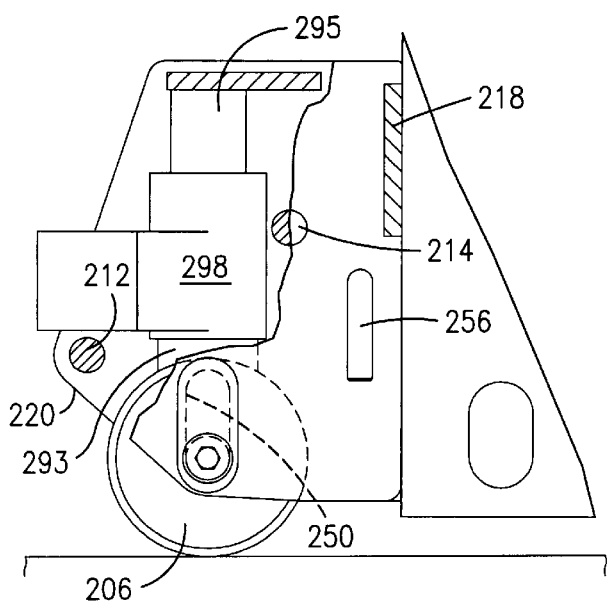
FIG. 19 is a side view in partial cross section of the wheel assembly of FIG. 14 having a portion thereof removed to illustrate actuation of the jack and illustrating the wheel assembly in a raised position.
Figure 20:
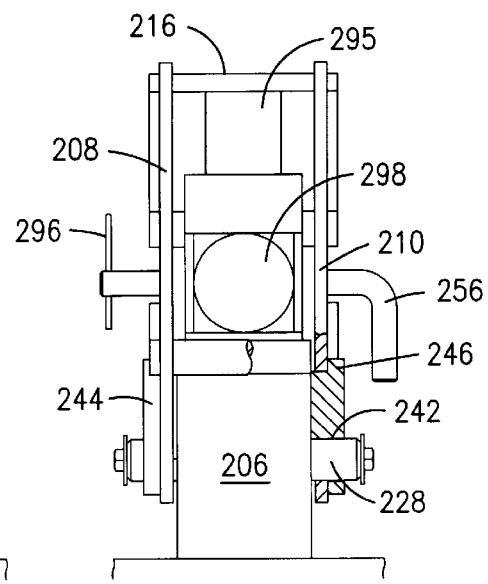
FIG. 20 is a front view in partial cross section of the wheel assembly of FIG. 14 in the raised position.

In operation and referring additionally to FIGS. 16–20, the attachment block 254 is fastened to the corner fitting 88 with the fastener 252, and the slide tabs 224, 226 are slid into the slide channels 286, 288. The locking member 256 is inserted through the pair of apertures 290 and the opening 292 to lock the wheel frame in place relative to both the attachment assembly and the container. The rear plate 218 abuts against the container 52 to stabilize the wheel assembly. At this point, the wheel is in the lowered position as shown in FIG. 17. A jack 298 is inserted into a jack receiving area 291 between the wheel 206 and the jack plate 216. The jack 298 includes a curved bottom 293 to engage the wheel 206 and a flat top 295 to engage the flat jack plate 216. The jack 298, which is preferably hydraulic, is then actuated to press the jack plate upwardly relative to the wheel to lift the wheel frame and container as illustrated in FIG. 19. The lock blocks are then manipulated to insert the inner portions 248 into the lock slots 230, 232 thereby locking the wheel in the raised position. The top 295 of the jack 298 is then retracted and the jack removed. Thus, a single jack can be used to place a container on wheels.

Using the wheel assembly 200 in the loading and unloading operation is described with reference to FIGS. 35–40. Wheel assemblies are attached to the opposed front corners 56, 57 of the container 52 and the winches 102, 104 are activated to initially draw the trailer underneath the front of the container while the container remains substantially stationary. When the container is almost entirely on the trailer, i.e., the back end of the trailer is within three or four feet of the rear 58 of the container, the trailer controls 80 are then operated to raise the back end 62 of the trailer 50, and wheel assemblies are attached to the opposed rear corners 84, 86 of the container. The back end of the trailer is then lowered again, and the winches are activated to pull the first container into place on the deck. The wheel frames are then removed from the attachment assemblies. The same procedure is repeated with the second container 96 or a forty foot container 94 with the exception that wheel assemblies are preferably not attached to the rear of the second container or of the forty foot container, so that the trailer is pulled underneath the container to load the container onto the trailer. If space permits, the wheel frames are left attached to the opposed front corners of the second container, and space permitting, preferably all of the attachment assemblies 204 are left on the containers.

In off loading the containers, the wheel frames are quickly reattached as described above to the attachment assemblies for off loading. After the containers are off-loaded, the attachment assemblies can then be removed from the corners of the ISO containers. As an alternative to the above loading operation, wheel assemblies could be attached to all four corners of the containers, and instead of the trailer being backed underneath the containers, the containers could be pulled up onto the trailer or some combination thereof.

Inversion Members and Operation

Referring to FIGS. 43–46, the trailer 50 is preferably provided with off-load pulleys 300 which act as inversion members to change the pulling direction 130 (FIG. 7) of the winches. The off-load pulleys 300 are operatively coupled with the container by a container attachment 302 and are rotatably mounted to the trailer with a trailer attachment 304.

The off-load pulleys 300 preferably comprise cylindrical disks. The perimeters 306 of the disks preferably define cable receiving grooves 308. Preferably, a first set of two pulleys 300A are positioned near to the front 60 of the deck 54, and a second set of two pulleys 300B are positioned near the center of the deck 54. Each pulley of the first set of pulleys 300A is positioned on opposite sides of the trailer at the same desired point along the length of the trailer approximately four feet from the front of the deck. The front pulleys are used to off-load a forty foot container as shown in FIG. 44 or off-load a front container. Each pulley of the second set of pulleys 300B are positioned on opposite sides of the trailer at the same desired point approximately four feet rearward from the center of the deck. The second set of pulleys can be used to off-load any container but are preferably used to off-load a rear twenty foot container.

For sake of brevity the off-load pulleys will be described with reference to only one pulley. The container attachment 302 preferably comprises one of the container guides 428 which will be discussed in detail below. The container attachment attaches the free end 128 of the cable 110 to the front corners 56, 57 of the container 52.

The trailer attachment 304 includes a shaft receptacle 310 welded to the side flange 68 of the deck 54. The shaft receptacle 310 receives a shaft 312 into a center aperture 320 and is locked in the shaft receptacle by a lock pin 314. The shaft 312 is fixed from rotation by the lock pin 314, so that the pulley rotates on a bushing 316 around the shaft 312. The pulley is attached to the shaft with a conventional fastener/washer assembly 318. Thus, the pulleys can be removed for transport or left attached in the shaft receptacle 310.

In operation, to unload a forty foot container 94, the winch cables 110 are wrapped around the first set of pulleys 300A and connected to the container attachment 302 at each front corner of the container as illustrated in FIG. 44. The winch is activated to pull the container rearwardly until the rear end of the container hangs far enough over the back end of the trailer, so that the rear of the container will not move while the tractor is driven from underneath the container.

To unload two twenty foot containers, the winch cables 110 are wrapped around the second set of pulleys 300B and the free ends 128 of the cables are attached to the front corners of the rear container 96 as shown in FIG. 43. The cables are held in the cable grooves 308 as the winches are activated to pull the container 96 rearwardly until it overhangs the back end of the trailer enough to be off-loaded. The cables are then disconnected from the rear container 96 wrapped around the first set of pulleys 300A and attached to the front corners of the front container 52. The winches are again activated pulling the container rearwardly. When the front of the container reaches the first set of pulleys 300A the winch cables are removed from the first set of pulleys and wrapped around the second set of pulleys to continue pulling the front container rearwardly until its rear end hangs over the back end of the trailer. If the winch cables have sufficient length they can be wrapped around the second set of pulleys initially. Thus, the pulleys operate to alter the pulling direction of the winches and preferably substantially invert the pulling direction of the winches, so that the power of the winches can be used to both load and off-load containers.

Off-Load Foot and Operation

Figure 32:
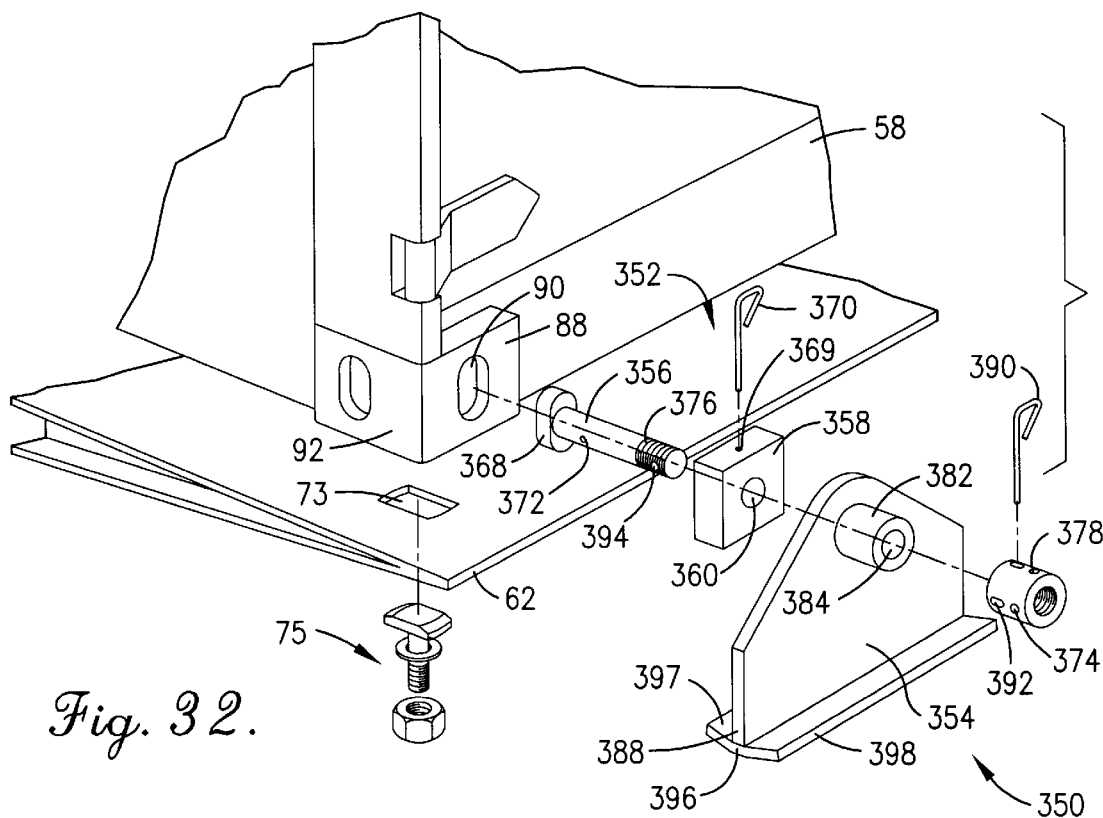
FIG. 32 is an exploded perspective view of an off-load foot according to the present invention.
Figure 33:
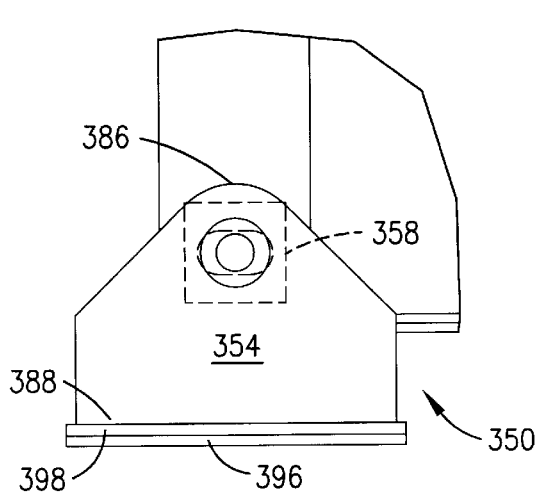
FIG. 33 is a rear view of the off-load foot of FIG. 32.
Figure 34:
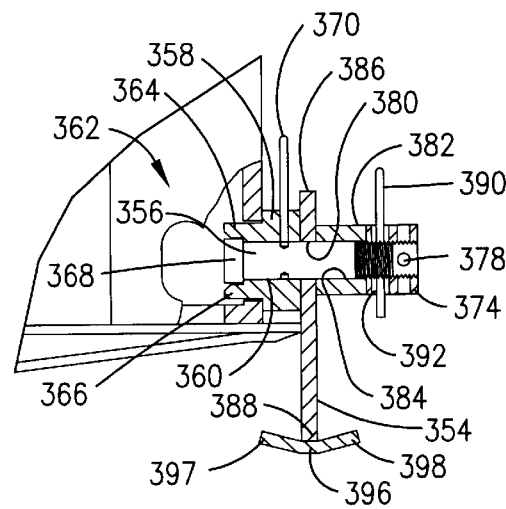
FIG. 34 is a vertical cross sectional view of the off-load foot of FIG. 32.

Referring to FIGS. 32–34, the off-load foot 350 includes an attachment assembly 352 for connection to a rear corner fitting of a container and a downwardly extending leg 354 connected to the attachment assembly. The downwardly extending leg 354 engages the ground surface 85 (FIG. 42) to aid in off loading containers.

The attachment assembly 352 comprises a fastener 356 for insertion into the opening 90 of the corner fitting 88 and an attachment block 358 having a central aperture 360 receiving the fastener therethrough. The block also includes a generally U-shaped fastener head engagement collar 362 which includes upper and lower legs 364, 366 for engaging the fastener head 368 and which fit between the fastener head and the ends of the opening 90 to fill the opening 90 whereby the attachment assembly 352 is substantially fixed from moving relative to the ISO container 52. The fastener 356, block 358, and collar 362 are substantially similar to and operate in substantially the same manner as those components provided on the attachment block of the wheel assembly.

The attachment block includes a pin hole 369 for receiving a pin 370 which extends through the pin hole and into an opening 372 in the fastener to hold the fastener and attachment block in place while the collar 374 is threaded onto a threaded end 376 of the fastener utilizing wrench holes 378 spaced around the circumference of the collar 374. To hold the tightened collar in place, a lock pin 390, preferably provided by transferring pin 370, is inserted through one of four collar lock slots 392 formed around the circumference of the collar and extends into an opening 394 in the threaded end 376 of the fastener 356.

The downwardly extending leg 354 includes an aperture 380 receiving the fastener therethrough and a cylindrical torsion resistance member 382 having a central aperture 384 concentric with the aperture 380 of the downwardly extending leg 354. The downwardly extending leg has an upper end 386 and a ground end 388 with the torsion resistance member 382 being attached adjacent to the upper end 386. The downwardly extending leg has a base 396 attached thereto having elongated upturned edges 397, 398. The upturned edges preferably extend across the entire length of the downwardly extending leg and allow the off-load foot to rock on top of the ground surface without damaging the ground surface.

In operation and referring to FIGS. 41 and 42, an off-load foot 350 is attached to each rear corner of the container, and the back end of the trailer is lowered until the base 396 contacts the ground surface 85 and lifts the rear end of the container off the back end of the trailer. The trailer is pulled forward out from underneath the container until there is approximately four feet of the container over hanging the back end of the trailer. This is a sufficient distance for the rear bottom edge of the container to securely engage the ground surface 85 without sliding. Preferably, the back end of the trailer is lifted again, and the off-load feet are removed. The trailer is then lowered and pulled forward the rest of the way out from underneath the container.

The off-load foot can also be utilized during the last several feet of pulling a trailer with a cambered/arced deck under, for example, a 40 foot container, to keep from dragging the container bottom on the trailer. The rear of the trailer is lifted, and an off-load foot is attached to each rear corner of the container. The rear of the trailer is then lowered until the ground end of the off-load foot securely contacts the ground surface and lifts the rear of the container off the camber of the trailer. The trailer can then be pulled under the container to a loaded position.

Cable Guides

Referring to FIGS. 3 through 6, the cable guide 400 is provided in combination with the trailer and includes a stake-hole post 402 and a guide portion 404 connected to a top end 406 of the stake-hole post. The stake-hole post is elongated and has a configuration and size, preferably two rods welded together, to fit snugly in a stake hole 73. The bottom end 412 of the stake-hole post is inserted into the stake hole. The guide portion 404 preferably comprises a cylindrical disk having a cable groove 408 formed in its perimeter. The disk is preferably rotatably secured to the stake-hole post with a fastener/washer assembly 410.

In operation, the cable guide 400 is used to align a container 53 that is out of alignment with the deck 54. The cable guide is capable of aligning the container 53 if the container is oriented at an angle with the deck or positioned to one side of the deck as shown in FIG. 3. The cable guide 400 is inserted into a desired stake hole along the length of the trailer. The cable 110 is positioned in the cable groove 408. The winches are activated pulling the container toward the deck and aligning the container with the deck. The cable guide can be moved from one stake hole to another to better achieve alignment, and cable guides can be used on both sides of the trailer. As the cable is pulled past the cable guide, the guide portion 404 rotates, so that the cable moves smoothly past the cable guide. The cable guide operates to alter the pulling direction of the winches, as desired, enough to align the container with the trailer.

Container Guides

Two embodiments of the container guides 420A, 420B are shown in FIGS. 14 and 16. The embodiment shown in FIG. 14 will be discussed first. The container guide 420A comprises a container guide body 422, an attachment mechanism 424 for attaching the container guide body to the container, a winch cable attachment assembly 426, and a elongated downwardly extending member 428.

The container guide body 422 is preferably a flat plate having a first aperture 430 for attachment to the cable and a second guide pin aperture 432 to receive the downwardly extending member 428. The apertures are approximately the same size, so that the cable can be attached to the rearward second aperture, or an added third aperture, for off loading containers with the inversion pulleys 300. The container guide body also has an attachment mechanism leg 434 connecting the container guide body to the attachment mechanism 424.

The attachment mechanism 424 comprises a twist lock tab 436 integral to the attachment leg 434 for connection to the corner fitting of the container. When the attachment leg 434 is vertically oriented as shown in phantom lines, it fits into the opening 90 of the corner fitting. The container body and attachment tab have been rotated ninety degrees to lock the attachment tab in the corner fitting. The twist lock tab 436 allows the container guide body 422 to pivot relative to the container. The degree of pivot is controlled by the pulling angle of the cable.

The winch cable attachment assembly 426 comprises a U-shaped cable termination 438 attached to the free end of the winch cable 110. Each leg 440, 442 comprises an aperture 444, 446 for alignment with the preferably circular aperture 430 in the container body, and the legs are spaced far enough apart to receive the container body therebetween. A lock member 448, preferably a cylindrical pin, extends through the apertures 430, 444, 446 to connect the free end 128 of the cable to the container guide body 422 and a safety pin 450 (FIG. 16) is inserted through an opening 452 in the bottom of the lock cylinder 448 to prevent unintentional removal.

The downwardly extending member 428 preferably comprises a cylindrical pin extending through the preferably circular aperture 432 in the container guide body. The member 428 includes an enlarged head 454 which prevents it from falling through the aperture 432. The downwardly extending member has a length sufficient to extend below a top surface of the deck, and the container guide body extends away from the container a sufficient distance for the downwardly extending member to be positioned beyond the side of the trailer.

In operation and with reference to FIGS. 21–23, the container guide body is connected to the corner fitting and the winch cable is connected to the container guide body. The winches are activated to start pulling the trailer underneath the container and when the container is far enough on to the deck 54, the elongated member 428 is dropped into the aperture 432 to hold the container in alignment with the deck 54. If the container is being pulled all the way to the front of the deck, a container guide is preferably attached to both the front and rear corners of the container. As the container is moved relative to the deck 54, the elongated member 428 contacts the sides 64, 66 of the deck. The elongated member 428, slides against the sides of the deck and preferably rotates in the aperture 432 to roll against the sides of the deck.

The container guide can be used in conjunction with the cable guides by placing the container guide on the corners and pulling the container towards the trailer until the elongated member 428 contacts the side of the container. The container guide then keeps the container from moving past the aligned position. This is particularly effective for correcting angular misalignments between the trailer and container.

Referring to FIGS. 16 and 30, the second embodiment of the container guide 420B includes a container guide body 456, an attachment mechanism 458 for attaching the container guide body to the container, a winch cable attachment assembly 460, and a elongated downwardly extending member 462. The winch cable attachment assembly 460 is substantially identical to the winch cable attachment assembly 426 of the prior embodiment and will not be described again.

The container guide body includes two legs 464, 466 spaced at an angle of approximately 90°. The first leg 464 comprises a short leg having an aperture 468 for attachment to the winch cable. The second leg 466 comprises a long leg which operates as the elongated member 462 and includes an aperture 470 for attachment to the winch cable 110. An extension sleeve 484 is attached to an inner side 488 (FIG. 30) of the body 456, so that the body is positioned beyond the side of the trailer. The edges of the body 456 have a chamfer 486 (FIG. 30) for engaging the side of the trailer. The container guide body 456 also includes a fastener aperture 472 at its pivot corner 474, so that the body 456 is attachable in two configurations. In one, the elongated member is substantially parallel to the deck and in the other, the elongated member extends below the top surface of the deck to engage the sides of the deck.

The attachment mechanism comprises a fastener 476, attachment block 478, collar 480, and safety pin 482 which are substantially identical to the similar components described in conjunction with the off-load foot. Thus, these components will not be described again.

In operation and referring to FIGS. 27–30, the cable is first attached to the aperture 470 in the long leg 466, and the trailer is pulled underneath the container until the front of the container is elevated enough over the ground surface 85, so that the elongated member 462 can be extended downwardly without contacting the ground surface. The cable is then removed from the long leg aperture 470; the container body 456 is pivoted on the fastener around the pivot corner 474 until the long leg 466 extends downwardly, and the cable is attached to the short leg aperture 468 to continue pulling the trailer underneath the container. The elongated member 462 contacts the sides of the trailer and operates to align the container and keep the container in alignment during loading.

Lockdown Mechanism

Referring to FIGS. 23–26, the lockdown mechanism 500 includes an attachment member 502 for attaching to the container, a pivotal securement member 504 for attaching to the deck, and an extension member 506. The attachment member 502 preferably comprises the container guide body 422 of the first embodiment of the container guide 420A incorporating a twist lock tab 507 for quick connection and disconnection to the corner fitting. The attachment member 502 also includes an extension member aperture 508 and a cable connection aperture 510.

The pivotal securement member 504 comprises a pair of generally rectangular tabs 512, 514 on opposite sides of the securement member. The securement members are preferably attached to the first and second outer faces 72 of each side flange 68, 70 so that there are a total of six securement members in locations corresponding to the four corners of a loaded front container 52 and to the two front corners of a rear container 96. The tabs are received in weldment brackets 516, 518 which define openings 522 between the brackets and the side flange 68 allowing the rectangular tabs 512, 514 to be pivoted therein between a lockdown position (FIG. 24) and a disconnected position (FIG. 23). The rectangular tabs 512, 514 also include a pivot chamfer 520 which provides further freedom in pivoting the tabs inside the openings 522. The pivotal securement member also includes an extension member opening 524 near its movable end 526.

The extension member 506 is preferably provided by the downwardly extending member 428 of the first embodiment of the container guide 420A. The extension member 506 is preferably cylindrical having an enlarged cylindrical head 528 to prevent it from passing through the extension member aperture 508. The lower end 530 of the extension member has an opening 532 to receive a lock pin 534 which prevents the securement member and the extension member from inadvertently disconnecting. Once connected, the extension member 506 is substantially perpendicular to the securement and attachment members which are substantially parallel to each other.

In operation, the container is moved to the location shown in FIG. 23 and the extension member 506 is lifted partially out of the extension aperture 508. The securement member 504 is pivoted upwardly toward the extension member until it is substantially parallel with the attachment member 502. The extension member is then inserted through the aperture 524 in the securement member 504, and the lock pin 534 is inserted through the opening 532 in the extension member. This lockdown mechanism replaces the conventional lockdown mechanism 75 shown in FIG. 32 which is still preferably used at the back end 62 of the deck. The improved lockdown mechanism 500 is easier to attach and remove and thus is preferably used at all container corners on both sides of the trailer. Because at least one, but preferably both, of the attachment member and the securement member extend far enough so that the apertures 524, 508 are positioned beyond the side flange, the extension member is positioned beyond the side of the trailer, and the lockdown mechanism is accessible from beside the deck.

The features of the disclosed self-contained trailer significantly simplify the loading and off-loading operations. The features allow a single person to load and off-load containers. Further, these features allow containers to be more easily loaded from angled and misaligned orientations.

Although preferred forms of the invention have been described above, it is to be recognized that such disclosure is by way of illustration only, and should not be utilized in a limiting sense in interpreting the scope of the present invention. Modifications to the exemplary embodiments, as herein above set forth, could be readily made by those skilled in the art without departing from the spirit of the appended claims.

The inventor(s) hereby state their intent to rely on the Doctrine of Equivalents to determine and assess the reasonably fair scope of their invention as pertains to any apparatus or method not materially departing from but outside the literal scope of the invention as set out in the following claims.

We claim:

1. A self-loading trailer comprising:
   a generally flat deck having a front end, a back end, a first side, and a second side,
   said deck being tiltable between a level transport position and a downwardly and rearwardly inclined loading position;
   a transport assembly including a pair of arms adjacent the front end of the deck, each of said arms being shiftable toward and away from an extended position in which an outer end of the arm is disposed laterally outboard of the deck beyond the corresponding first or second side of the deck;
   a pair of winches on the outer ends of the arms; and
   a control mechanism operatively connected to the transport assembly for selectively shifting the arms,
   said control mechanism further being operatively connected to said winches for activating the same when the arms are in their extended positions and the deck is in its loading position.

2. The trailer according to claim 1 wherein the transport assembly comprises an actuating cylinder for shifting the arms.

3. The trailer according to claim 1 wherein the control mechanism comprises a remote control for operating the arms and the winches.

4. The trailer according to claim 1 wherein the transport assembly further comprises a generally fixed guide shell centrally located relative to the deck, and the guide shell having said arms slidably received therein.

5. The trailer according to claim 4 wherein one of said arms is slidably received in the other of said arms, and each arm comprises a stop restricting extension lengths of the arms.

6. A method for use in loading a pair of containers onto a trailer having a deck that is tiltable between a level position and a downwardly and rearwardly inclined loading position, said method comprising the steps of:

lowering the deck into its loading position;

shifting a pair of winches out of stowed positions disposed substantially within lateral confines of the deck into laterally outwardly disposed operating positions outboard of opposite sides of the deck;

connecting cables from the two winches to opposite lower front corners of the first container of the pair;

pulling the first container onto the deck using the winches while the deck is being moved rearwardly under the first container;

disconnecting the cables from the first container after the first container has been loaded onto the deck;

connecting the cables to opposite lower front corners of the second container of the pair;

pulling the second container onto the lowered deck behind the first container while the deck is being moved rearwardly under the second container;

disconnecting the cables from the second container after the second container has been loaded onto the deck; and retracting the winches back into their stowed positions.

* * * * *